United States Patent
Go et al.

(10) Patent No.: US 11,864,177 B2
(45) Date of Patent: Jan. 2, 2024

(54) METHOD FOR PERFORMING BEAM FAILURE RECOVERY PROCEDURE IN WIRELESS COMMUNICATION SYSTEM AND DEVICE THEREFOR

(71) Applicant: LG ELECTRONICS INC., Seoul (KR)

(72) Inventors: Seongwon Go, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/121,230

(22) Filed: Mar. 14, 2023

(65) Prior Publication Data

US 2023/0247626 A1 Aug. 3, 2023

Related U.S. Application Data

(63) Continuation of application No. 17/758,868, filed as application No. PCT/KR2022/000975 on Jan. 19, 2022.

(51) Int. Cl.
*H04W 72/1268* (2023.01)
*H04W 76/19* (2018.01)
*H04W 72/21* (2023.01)

(52) U.S. Cl.
CPC ....... *H04W 72/1268* (2013.01); *H04W 72/21* (2023.01); *H04W 76/19* (2018.02)

(58) Field of Classification Search
CPC .. H04W 72/1268; H04W 72/21; H04W 76/19
(Continued)

(56) References Cited

U.S. PATENT DOCUMENTS

| | | | |
|---|---|---|---|
| 2021/0091844 A1* | 3/2021 | Koskela | H04W 36/305 |
| 2021/0320710 A1* | 10/2021 | Koskela | H04B 17/309 |
| 2022/0046441 A1* | 2/2022 | Agiwal | H04L 5/0023 |

FOREIGN PATENT DOCUMENTS

| | | |
|---|---|---|
| JP | 2020534717 | 11/2020 |
| KR | 10-2020-0022361 | 3/2020 |
| WO | 2019130523 | 7/2019 |

OTHER PUBLICATIONS

PCT International Application No. PCT/KR2022/000975, International Search Report dated May 3, 2022, 3 pages.
(Continued)

*Primary Examiner* — Chi Tang P Cheng
(74) *Attorney, Agent, or Firm* — LEE HONG DEGERMAN KANG WAIMEY

(57) ABSTRACT

A method for performing a beam failure recovery procedure in a wireless communication system according to an embodiment of the present disclosure, the method performed by a user equipment (UE) includes receiving configuration information related to the BFR, receiving a downlink reference signal (DL RS) based on the configuration information, detecting a beam failure based on measurement for the DL RS, and transmitting a request message for the BFR. The request message for the BFR is transmitted based on a PUCCH resource related to a scheduling request (SR). 1) The PUCCH resource related to the SR is one of a plurality of PUCCH resources configured for the beam failure recovery, and 2) the beam failure is based on being related to one or more cells: the PUCCH resource related to the SR is a specific PUCCH resource determined based on a preconfigured criterion among the plurality of PUCCH resources.

9 Claims, 13 Drawing Sheets

(58) Field of Classification Search
USPC .......................................................... 370/329
See application file for complete search history.

(56) References Cited

OTHER PUBLICATIONS

Samsung, "Offline Discussion 112 : EMIMO MAC Corrections," R2-2003891, 3GPP TSG-RAN2 Meeting #109bis Electronics, Apr. 2020, 26 pages.
Moderator (CATT), "Summary on beam management for simultaneous multi-TRP transmission with multiple Rx panels," R1-2009500, 3GPP TSG RAN WG1 Meeting #103-e, e-Meeting, Nov. 2020, 42 pages.
AT&T, "On beam recovery for partial and full control channel failure," R1-1716690, 3GPP TSG RAN WG1 Meeting NR#3, Sep. 2017, 9 pages.
Mediatek Inc., "Summary 2 on Remaing issues on Beam Failure Recovery Document for: Discussion," R1-1807796, 3GPP TSG RAN WG1 Meeting #93, May 2018, 31 pages.
Japan Patent Office Application No. 2022-543476, Office Action dated Jun. 13, 2023, 2 pages.

* cited by examiner

[FIG. 1]
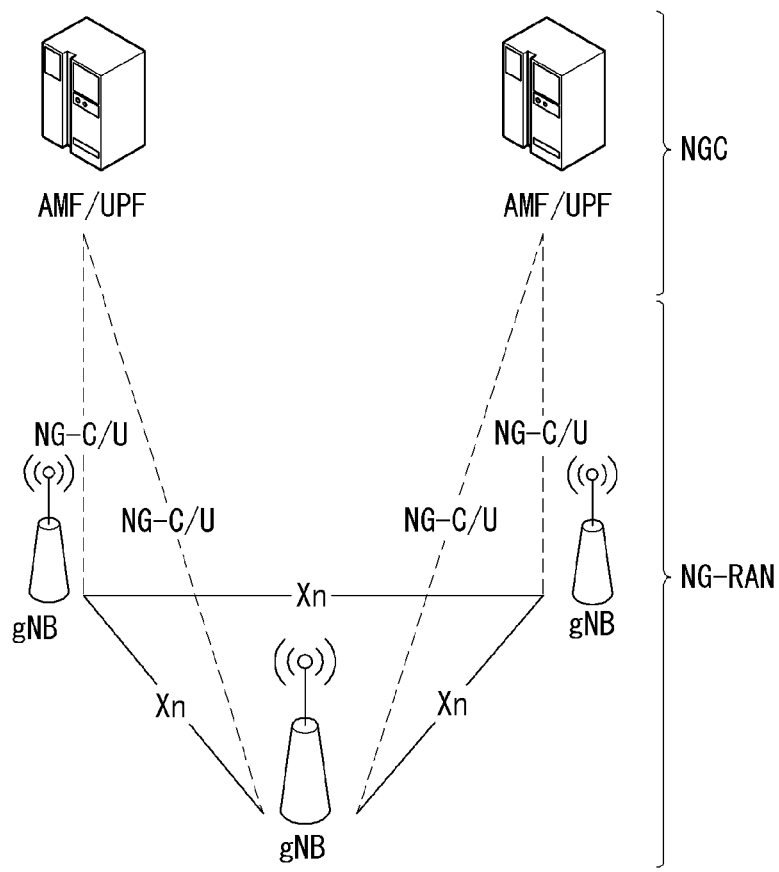
[FIG. 2]
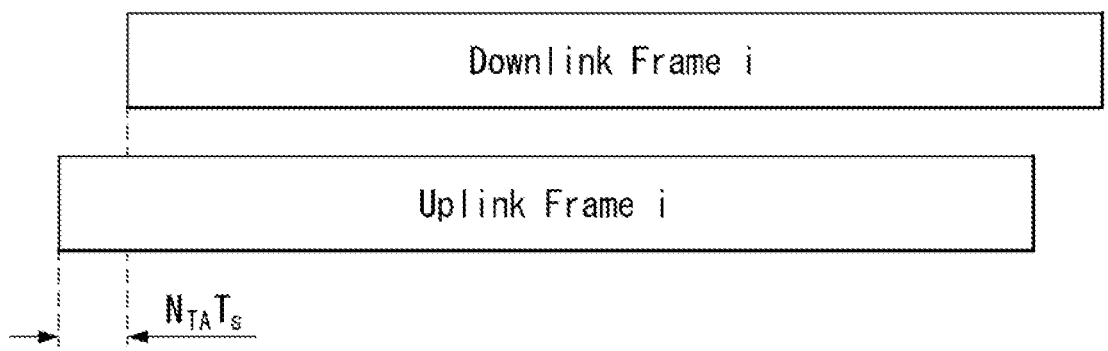

[FIG. 3]
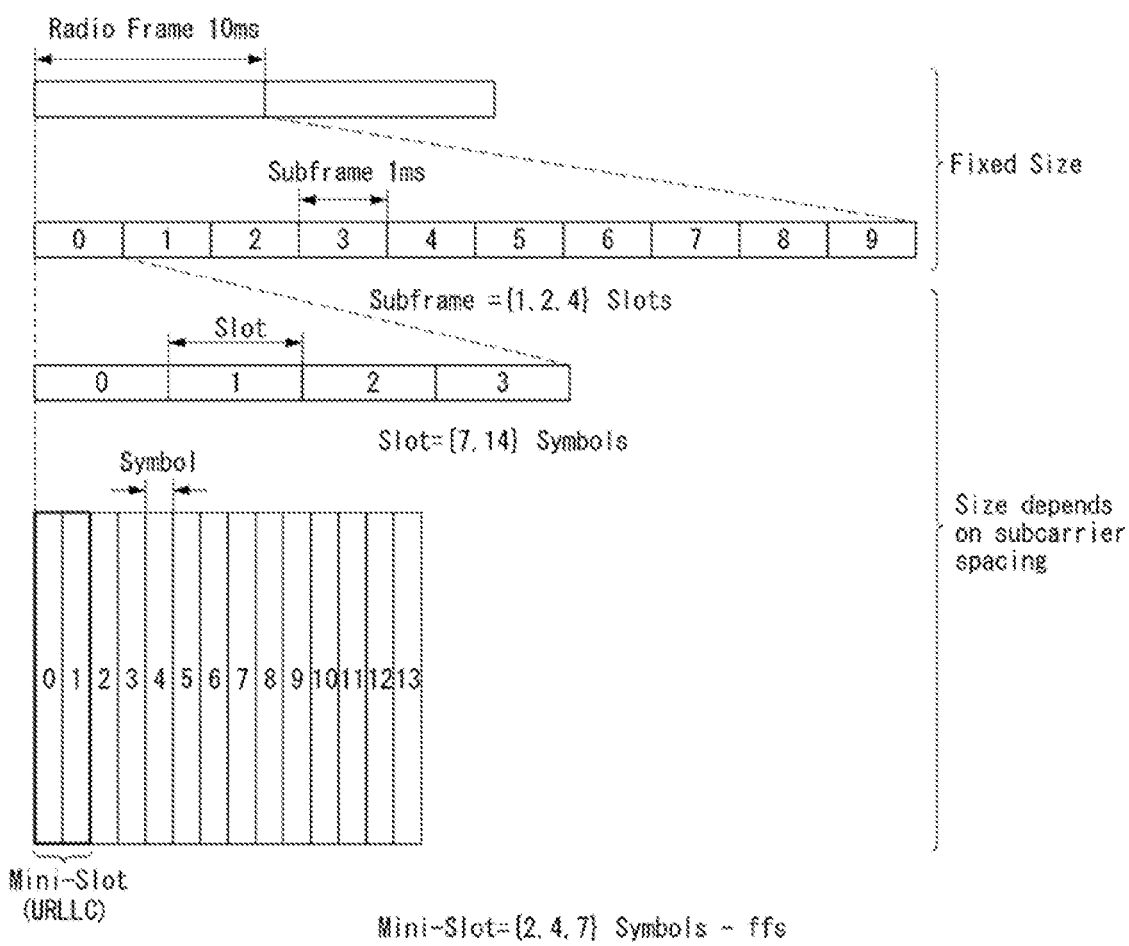

[FIG. 4]
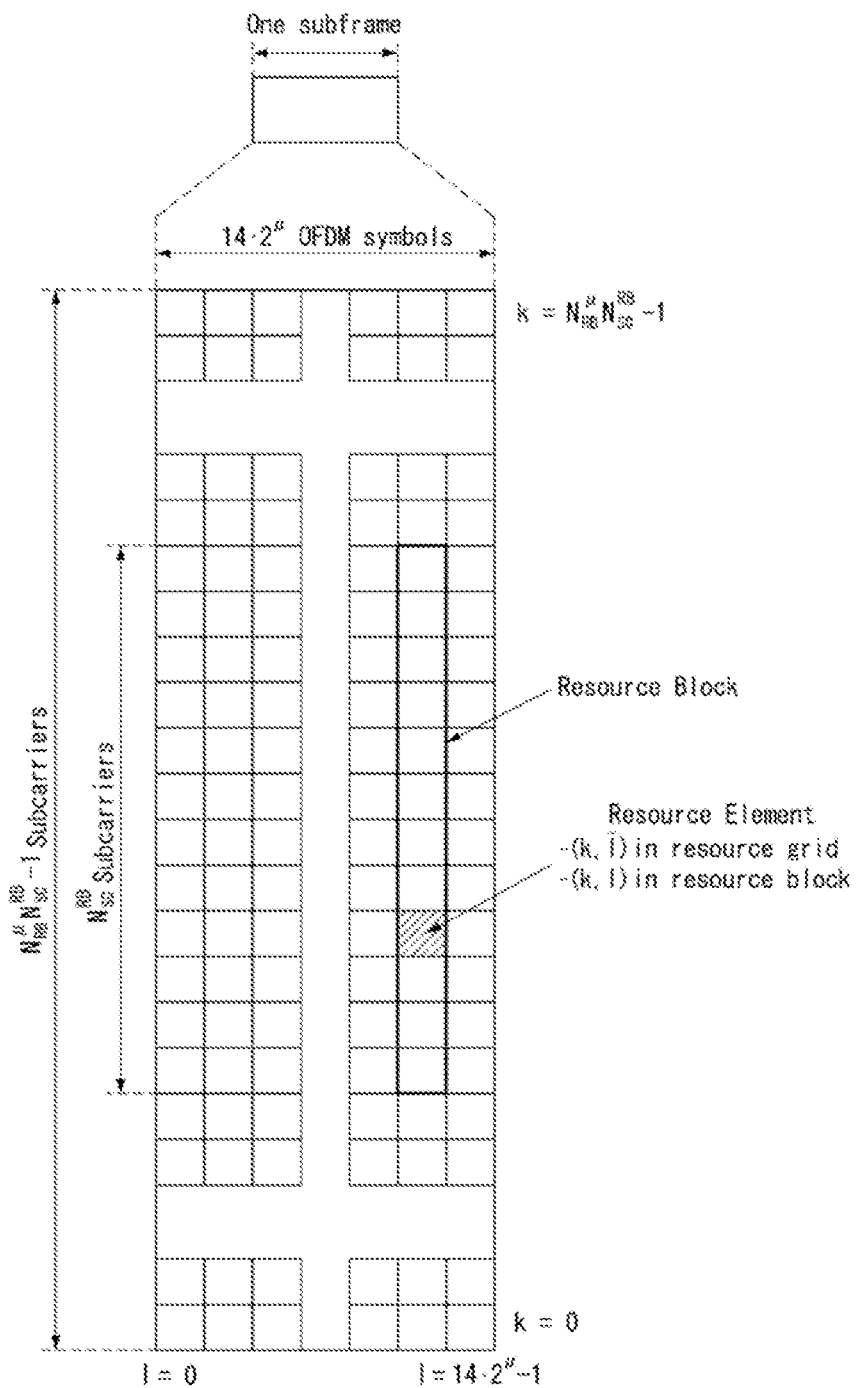

[FIG. 5]
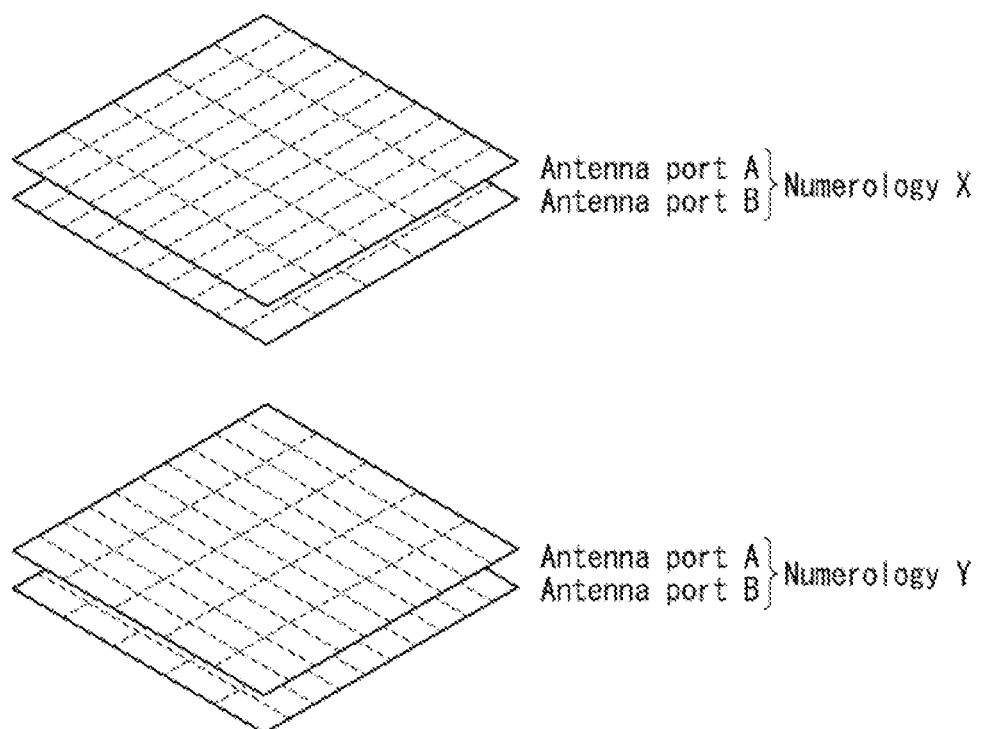

[FIG. 6]
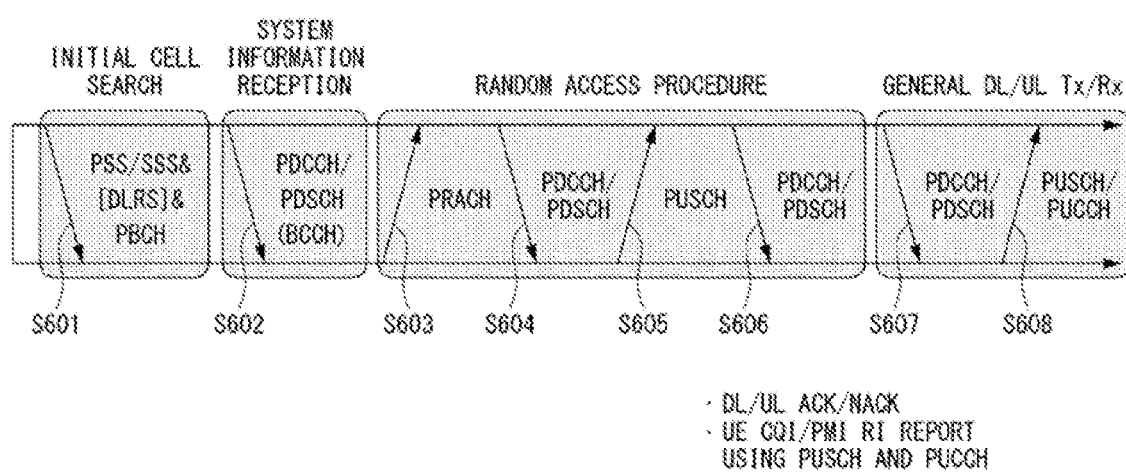

[FIG. 7]
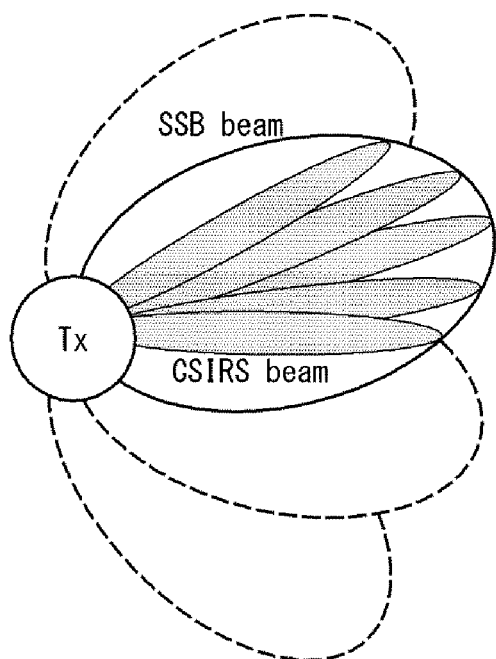
[FIG. 8]
Base station Rx beam sweeping
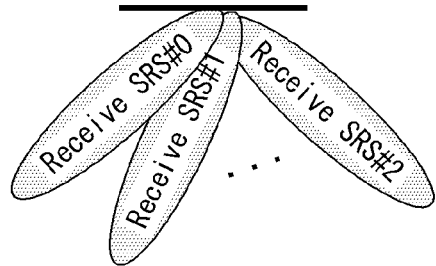
UE TX beam (being fixed)
(a)
Base station beam being fixed
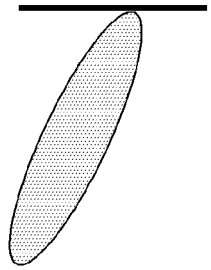
UE Tx beam sweeping
(b)

[FIG. 9]
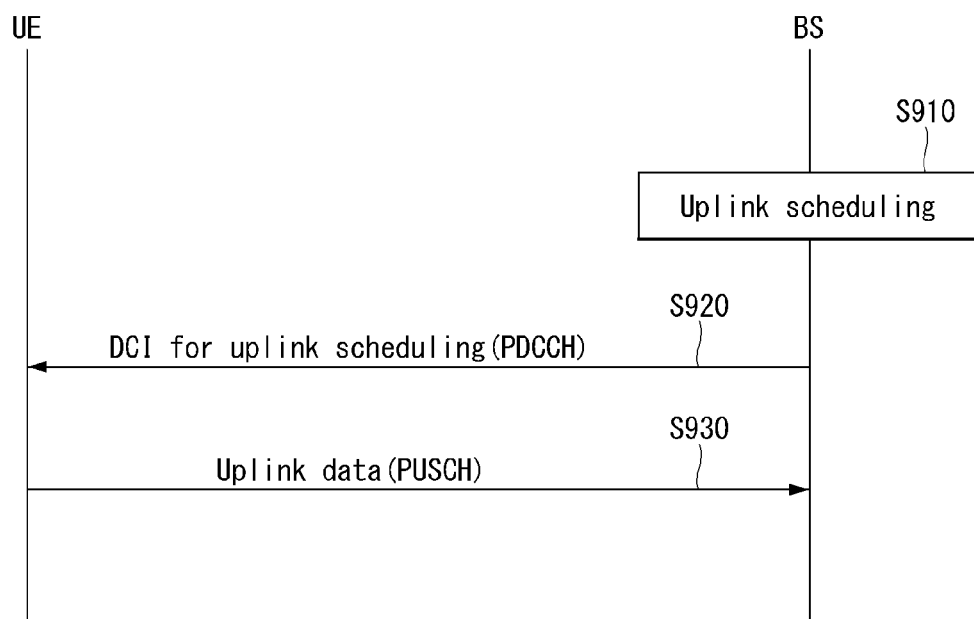

[FIG. 10]
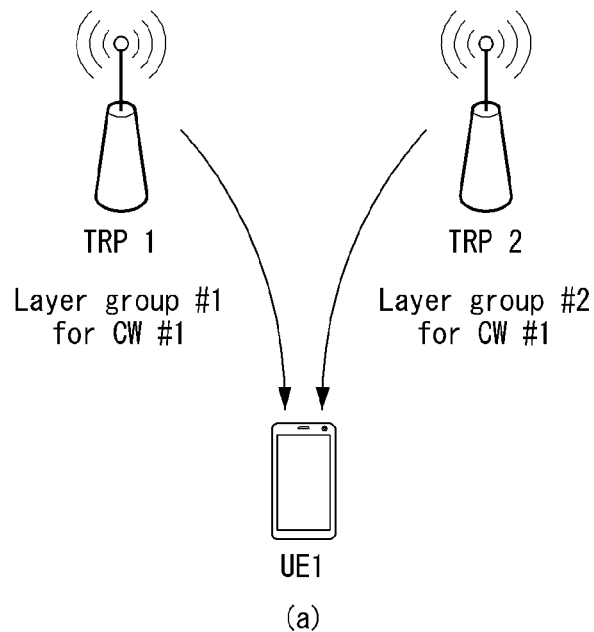
(a)
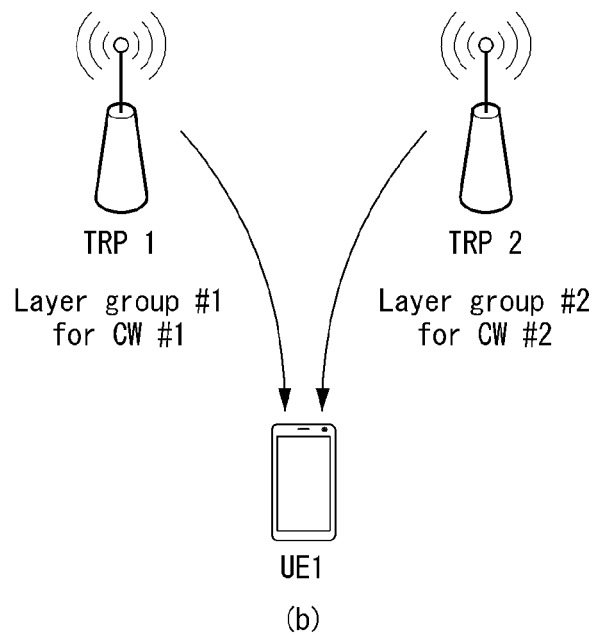
(b)

[FIG. 11]
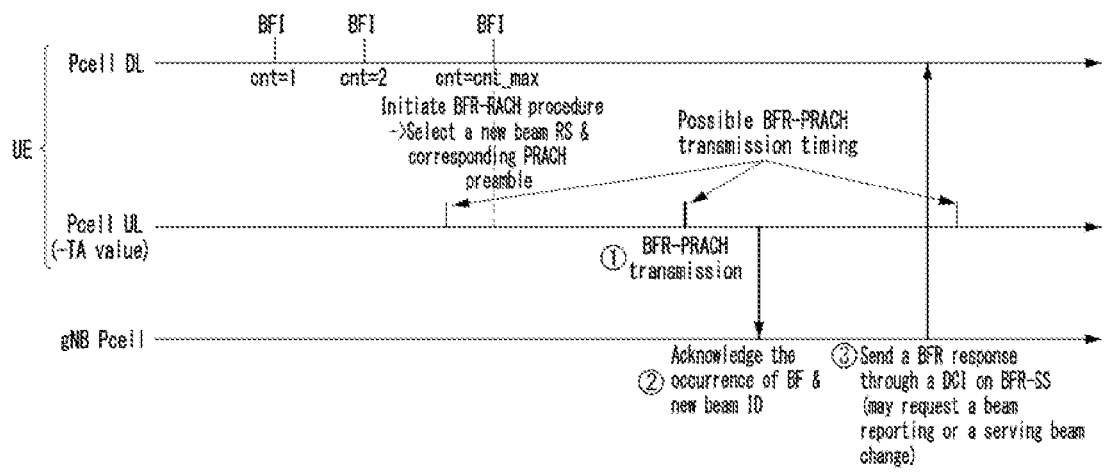

[FIG. 12]
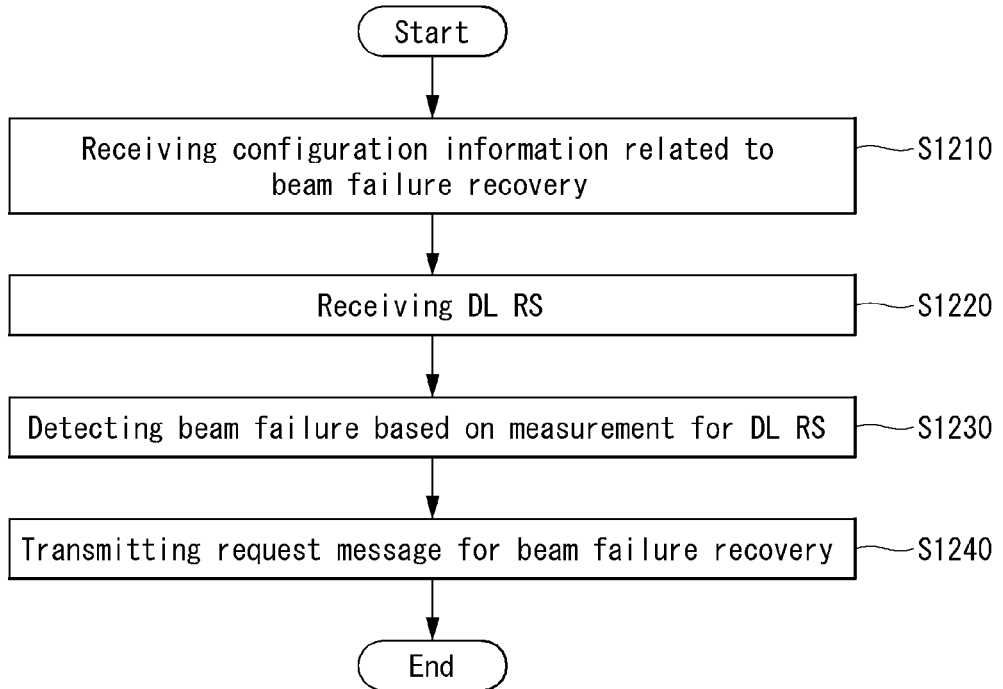
[FIG. 13]
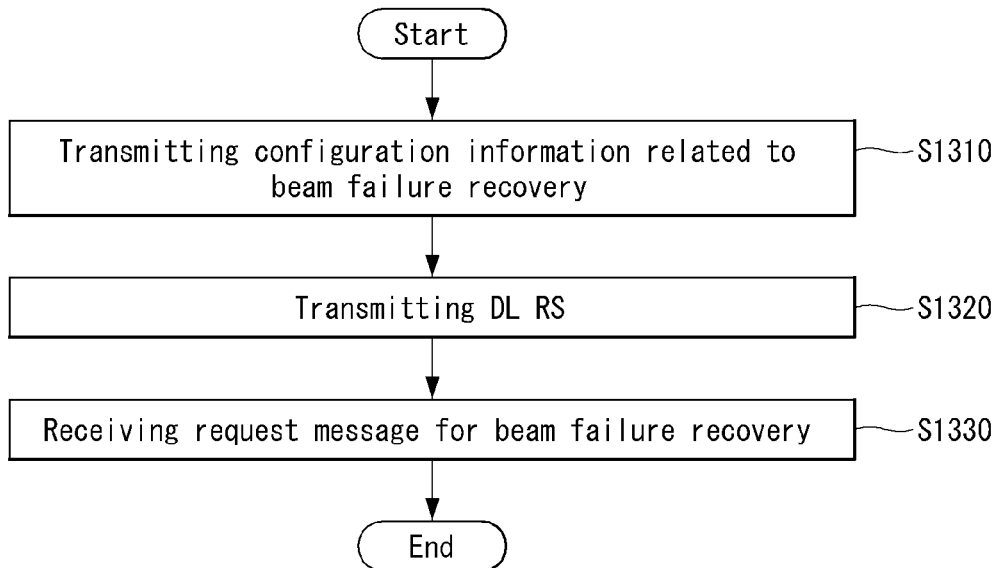

[FIG. 14]
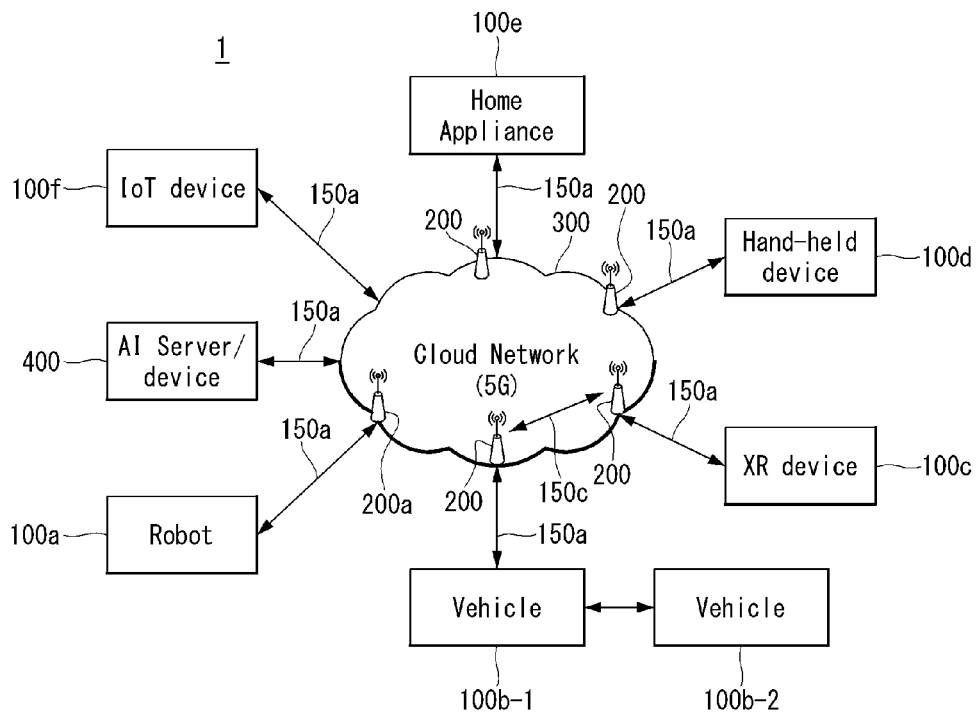
[FIG. 15]
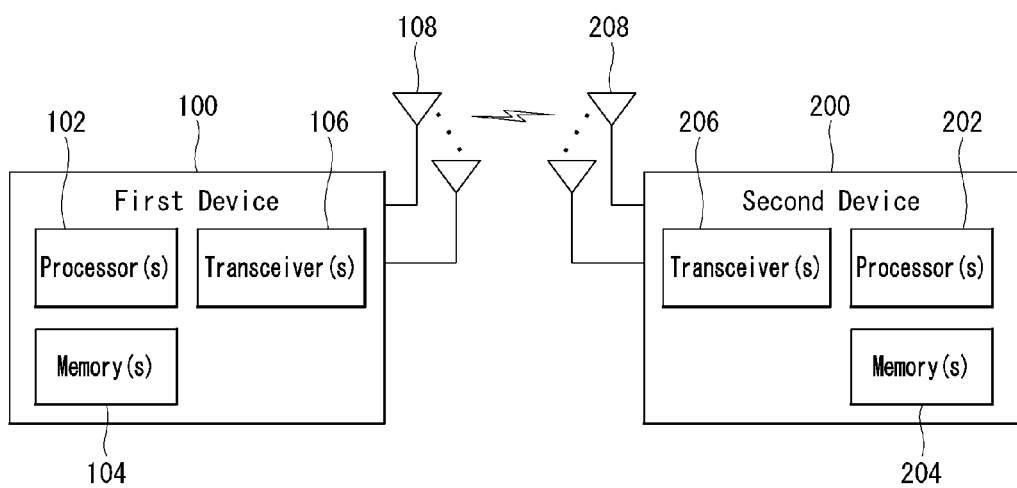

[FIG. 16]
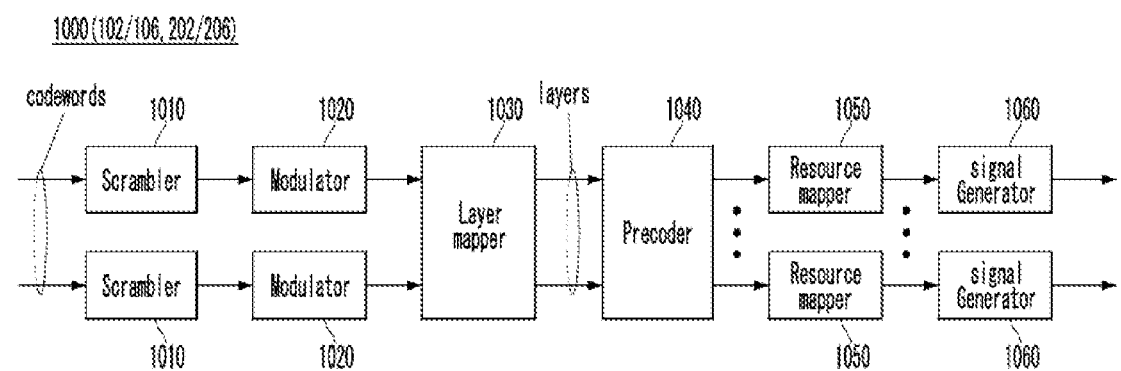

[FIG. 17]
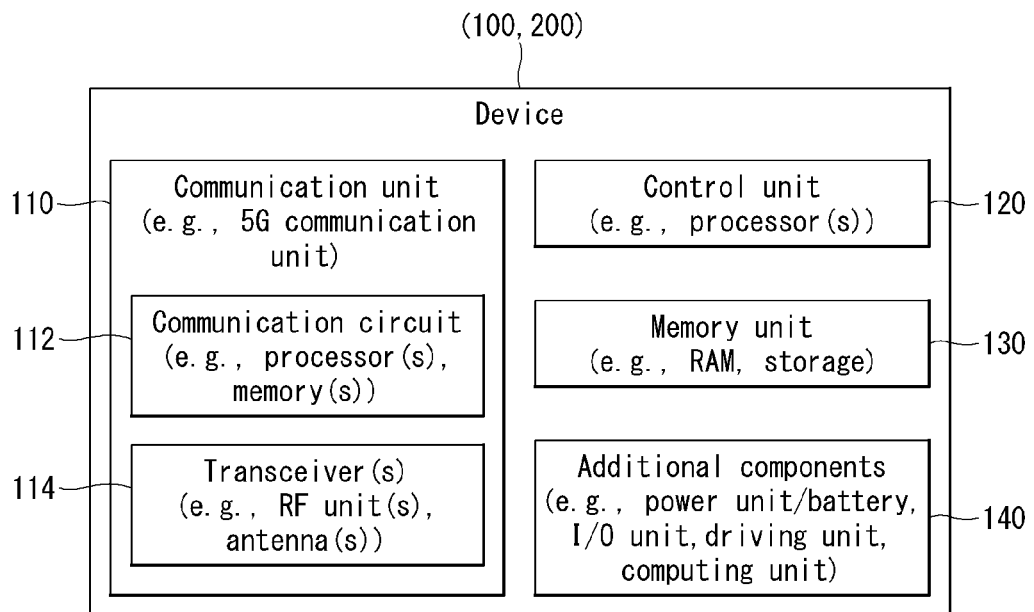
[FIG. 18]
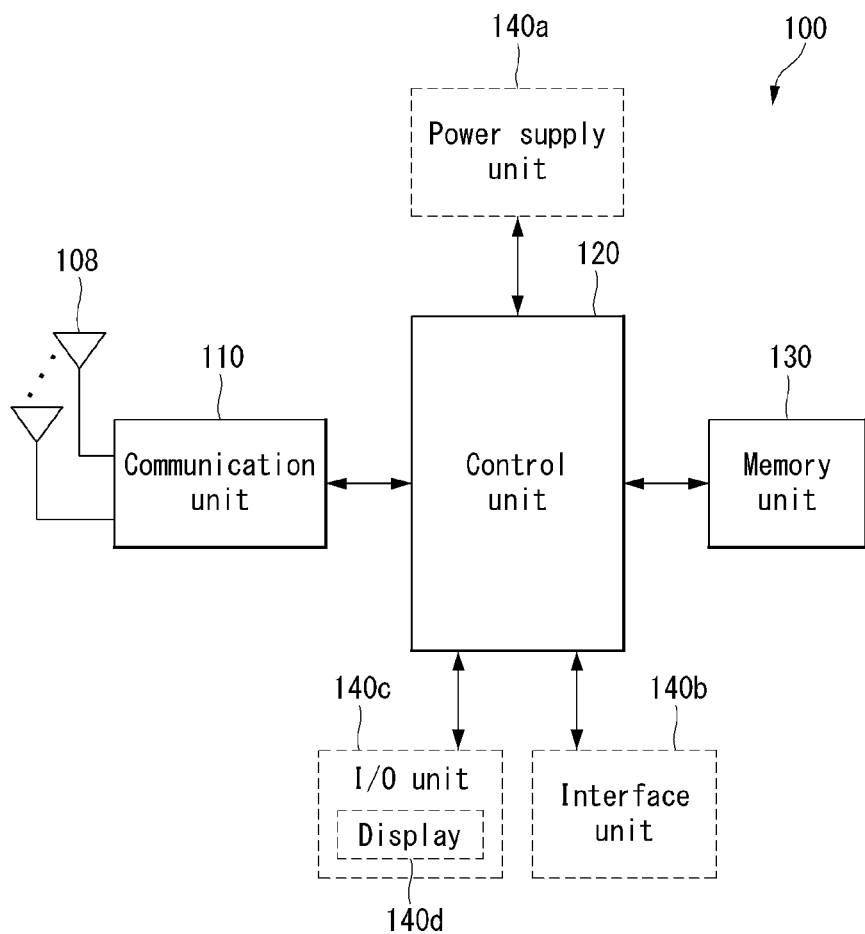

METHOD FOR PERFORMING BEAM FAILURE RECOVERY PROCEDURE IN WIRELESS COMMUNICATION SYSTEM AND DEVICE THEREFOR

CROSS-REFERENCE TO RELATED APPLICATIONS

This application is a continuation of U.S. patent application Ser. No. 17/758,868, filed on Jul. 14, 2022, which is the National Stage filing under 35 U.S.C. 371 of International Application No. PCT/KR2022/000975, filed on Jan. 19, 2022, which claims the benefit of earlier filing date and right of priority to Korean Application No. 10-2021-0009754, filed on Jan. 22, 2021, the contents of which are all hereby incorporated by reference herein in their entirety.

TECHNICAL FIELD

The present disclosure relates to a method for performing a beam failure recovery procedure in a wireless communication system in a wireless communication system and a device therefor.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

If the BFR operation defined in NR Rel-15 is applied to the M-TRP environment (multi-PDCCH based NCJT environment) as it is, the following problems may occur.

If all CORESETs belonging to a specific TRP are in a beam failure situation, but there is a CORESET other than beam failure among CORESETs belonging to other TRPs, the corresponding UE does not determine that it is a beam failure (BF) situation. In this situation, if the all beam failed TRP is a TRP (e.g. Primary TRP) responsible for the transmission of important control information (e.g. SIB, RA, Paging), even if (specific beam of) the other TRP (e.g. Secondary TRP) is in a non-BF situation, there is a problem that the corresponding important control information cannot be received.

In order to solve the above problem, TRP-specific beam failure recovery (TRP-specific BFR) needs to be supported. In order to support the TRP-specific beam failure recovery, a plurality of PUCCH resources (e.g. multiple PUCCH-SR resources) may be configured. For example, in the plurality of PUCCH resources, PUCCH resource 1 may be related to TRP 1, and PUCCH resource 2 may be related to TRP 2.

DISCLOSURE

Technical Problem

To support TRP-specific beam failure recovery, a beam failure detection operation may be performed for each TRP (e.g. beam failure detection based on measurement for each DL RS set). In this case, a case may occur in which beam failure in a specific cell is different from beam failure in another cell. As a specific example, the beam failure in the specific cell may be related to a first TRP (e.g. first DL RS set, first PUCCH resource), and the beam failure in another cell may be related to a second TRP (e.g. second DL RS set, second PUCCH resource) may be related.

When the DL RS set in which the beam failure is detected for each cell is different, ambiguity may occur in terms of the UE operation as to which PUCCH resource among the above-described plurality of PUCCH resources should be utilized for BFR.

An object of the present disclosure is to propose a beam failure recovery method for solving the above-described problems.

Technical problems to be solved by the present disclosure are not limited by the above-mentioned technical problems, and other technical problems which are not mentioned above can be clearly understood from the following description by those skilled in the art to which the present disclosure pertains.

Technical Solution

A method for performing a beam failure recovery (BFR) procedure in a wireless communication system according to an embodiment of the present disclosure, the method performed by a user equipment (UE) comprises receiving configuration information related to the BFR, receiving a downlink reference signal (DL RS) based on the configuration information, detecting a beam failure based on measurement for the DL RS, and transmitting a request message for the BFR.

The request message for the BFR is transmitted based on a PUCCH resource related to a scheduling request (SR), and the DL RS is based on a plurality of DL RS sets for a beam failure detection.

Based on 1) the PUCCH resource related to the SR being one of a plurality of PUCCH resources configured for the beam failure recovery and 2) the beam failure being related to one or more cells: the PUCCH resource related to the SR is a specific PUCCH resource determined based on a pre-configured criterion among the plurality of PUCCH resources.

Each of the plurality of PUCCH resources may be associated with at least one of i) one DL RS set among the plurality of DL RS sets, ii) a control resource set pool index (CORESET pool index) or iii) a subset of all CORESETs in a bandwidth part (BWP).

The specific PUCCH resource may be associated with at least one of i) a primary cell (PCell) or ii) a primary secondary cell (PSCell).

The specific PUCCH resource may be related to a specific DL RS set, and the specific DL RS set may be a DL RS set determined based on a number of beam failure detections among DL RS sets related to the one or more cells.

The specific PUCCH resource may be a PUCCH resource having a lowest index among the plurality of PUCCH resources.

The specific PUCCH resource may be a PUCCH resource related to specific spatial related information among the plurality of PUCCH resources.

The specific PUCCH resource may be a PUCCH resource related to a specific transmission configuration indication state (specific TCI state) among the plurality of PUCCH resources.

The method may further comprise transmitting a physical uplink shared channel (PUSCH) related to the BFR.

The PUSCH related to the BFR may be related to a BFR medium access control-control element (BFR MAC-CE).

The BFR MAC-CE may include information on a DL RS set related to a beam failure detected in each cell among the one or more cells.

A user equipment (UE) performing a beam failure recovery (BFR) procedure in a wireless communication system according to another embodiment of the present disclosure, the UE comprises one or more transceivers, one or more processors controlling the one or more transceivers, and one or more memories operably connected to the one or more processors.

The one or more memories store instructions for performing operations based on being executed by the one or more processors.

The operations includes receiving configuration information related to the BFR, receiving a downlink reference signal (DL RS) based on the configuration information, detecting a beam failure based on measurement for the DL RS, and transmitting a request message for the BFR.

The request message for the BFR is transmitted based on a PUCCH resource related to a scheduling request (SR), and the DL RS is based on a plurality of DL RS sets for a beam failure detection.

Based on 1) the PUCCH resource related to the SR being one of a plurality of PUCCH resources configured for the beam failure recovery and 2) the beam failure being related to one or more cells: the PUCCH resource related to the SR is a specific PUCCH resource determined based on a pre-configured criterion among the plurality of PUCCH resources.

A device for controlling a user equipment (UE) to perform a beam failure recovery (BFR) procedure in a wireless communication system according to another embodiment of the present disclosure, the device comprises one or more processors and one or more memories operably connected to the one or more processors.

The one or more memories store instructions for performing operations based on being executed by the one or more processors.

The operations include receiving configuration information related to the BFR, receiving a downlink reference signal (DL RS) based on the configuration information, detecting a beam failure based on measurement for the DL RS, and transmitting a request message for the BFR.

The request message for the BFR is transmitted based on a PUCCH resource related to a scheduling request (SR), and the DL RS is based on a plurality of DL RS sets configured for the beam failure detection.

Based on 1) the PUCCH resource related to the SR being one of a plurality of PUCCH resources configured for the beam failure recovery and 2) the beam failure being related to one or more cells: the PUCCH resource related to the SR is a specific PUCCH resource determined based on a pre-configured criterion among the plurality of PUCCH resources.

One or more non-transitory computer-readable medium according to another embodiment of the present disclosure stores one or more instructions.

The one or more instructions perform operations based on being executed by one or more processors.

The operations include receiving configuration information related to the BFR, receiving a downlink reference signal (DL RS) based on the configuration information, detecting a beam failure based on measurement for the DL RS, and transmitting a request message for the BFR.

The request message for the BFR is transmitted based on a PUCCH resource related to a scheduling request (SR), and the DL RS is based on a plurality of DL RS sets for a beam failure detection.

Based on 1) the PUCCH resource related to the SR being one of a plurality of PUCCH resources configured for the beam failure recovery and 2) the beam failure being related to one or more cells: the PUCCH resource related to the SR is a specific PUCCH resource determined based on a pre-configured criterion among the plurality of PUCCH resources.

A method for performing a beam failure recovery (BFR) procedure in a wireless communication system according to another embodiment of the present disclosure, the method performed by a base station comprises transmitting configuration information related to the BFR, transmitting a downlink reference signal (DL RS) based on the configuration information, and receiving a request message for the BFR.

The request message for the BFR is related to a beam failure detected based on measurement for the DL RS.

The request message for the BFR is received based on a PUCCH resource related to a scheduling request (SR), and the DL RS is based on a plurality of DL RS sets for a beam failure detection.

Based on 1) the PUCCH resource related to the SR being one of a plurality of PUCCH resources configured for the beam failure recovery and 2) the beam failure being related to one or more cells: the PUCCH resource related to the SR is a specific PUCCH resource determined based on a pre-configured criterion among the plurality of PUCCH resources.

A base station performing a beam failure recovery (BFR) procedure in a wireless communication system according to another embodiment of the present disclosure, the base station comprises one or more transceivers, one or more processors controlling the one or more transceivers, and one or more memories operably connected to the one or more processors.

The one or more memories store instructions for performing operations based on being executed by the one or more processors.

The operations include transmitting configuration information related to the BFR, transmitting a downlink reference signal (DL RS) based on the configuration information, and receiving a request message for the BFR.

The request message for the BFR is received based on a PUCCH resource related to a scheduling request (SR), and the DL RS is based on a plurality of DL RS sets for a beam failure detection.

Based on 1) The PUCCH resource related to the SR being one of a plurality of PUCCH resources configured for the beam failure recovery and 2) the beam failure being related to one or more cells: the PUCCH resource related to the SR is a specific PUCCH resource determined based on a pre-configured criterion among the plurality of PUCCH resources.

Advantageous Effects

According to an embodiment of the present disclosure, TRP-specific beam failure recovery (TRP-specific BFR) may be supported. That is, as the beam failure of a specific TRP is not declared as a beam failure situation, a failure in transmission and reception of important control information that occurs can be prevented.

According to the embodiment of the present disclosure, ambiguity in the UE operation related to PUCCH resource determination that may occur when beam failure recovery is performed specifically for TRP can be prevented. Since the ambiguity related to the PUCCH resource determination for BFRQ transmission is eliminated, the reliability of the M-TRP-related beam failure recovery procedure may be improved.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram illustrating an example of an overall system structure of NR to which a method proposed in the present disclosure is applicable.

FIG. 2 illustrates a relationship between an uplink frame and a downlink frame in a wireless communication system to which a method proposed by the present disclosure is applicable.

FIG. 3 illustrates an example of a frame structure in an NR system.

FIG. 4 illustrates an example of a resource grid supported by a wireless communication system to which a method proposed in the present disclosure is applicable.

FIG. 5 illustrates examples of a resource grid for each antenna port and numerology to which a method proposed in the present disclosure is applicable.

FIG. 6 illustrates physical channels and general signal transmission used in a 3GPP system.

FIG. 7 illustrates an example of beamforming using SSB and CSI-RS.

FIG. 8(a) and FIG. 8(b) illustrate an example of a UL BM procedure using an SRS.

FIG. 9 illustrates an uplink transmission/reception operation to which the method proposed in this disclosure may be applied.

FIG. 10(a) and FIG. 10(b) illustrate an example of a transmission/reception method for improving reliability using transmission in multiple TRPs.

FIG. 11 is a diagram for describing a beam failure recovery related operation to which a method proposed in the present disclosure may be applied.

FIG. 12 is a flowchart for describing a method of performing, by a UE, a beam failure recovery procedure in a wireless communication system according to an embodiment of the present disclosure.

FIG. 13 is a flowchart for describing a method of performing, by a BS, a beam failure recovery procedure in a wireless communication system according to another embodiment of the present disclosure.

FIG. 14 illustrates a communication system 1 applied to the present disclosure.

FIG. 15 illustrates wireless devices applicable to the present disclosure.

FIG. 16 illustrates a signal process circuit for a transmission signal.

FIG. 17 illustrates another example of a wireless device applied to the present disclosure.

FIG. 18 illustrates a hand-held device applied to the present disclosure.

MODE FOR INVENTION

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11(Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referenced.

3GPP LTE
36.211: Physical channels and modulation
36.212: Multiplexing and channel coding
36.213: Physical layer procedures
36.300: Overall description
36.331: Radio Resource Control (RRC)

3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. As such, the introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. By scaling a reference subcarrier spacing by an integer N, different numerologies may be defined.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used at an NG2 reference point between new RAN and NGC.

NG-U: A user plane interface used at an NG3 reference point between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: An end point of NG-U interface.

Overview of System

FIG. 1 illustrates an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an Xn interface.

The gNBs are connected to the NGC via the NG interface.

More specifically, the gNB connects to the access and mobility management function (AMF) via the N2 interface and connects to the user plane function (UPF) via the N3 interface.

New RAT (NR) numerology and frame structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, µ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | Δf = $2^μ$ · 15[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

With regard to the frame structure in the NR system, the size of various fields in the time domain is expressed as a multiple of time unit of $T_s=1/(\Delta f_{max}\cdot N_f)$, where $\Delta f_{max}=480\cdot 10^3$, and $N_f=4096$. Downlink and uplink transmissions is constituted of a radio frame with a period of $T_f=(\Delta f_{max}/100)\cdot T_s=10$ ms. Here, the radio frame is constituted of 10 subframes each of which has a period of $T_{sf}=(\Delta f_{max}N_f/1000)\cdot T_s=1$ ms. In this case, one set of frames for uplink and one set of frames for downlink may exist.

FIG. 2 illustrates a relationship between an uplink frame and downlink frame in a wireless communication system to which a method described in the present disclosure is applicable.

As illustrated in FIG. 2, uplink frame number i for transmission from the user equipment (UE) should begin $T_{TA}=N_{TA}T_s$ earlier than the start of the downlink frame by the UE.

For numerology μ, slots are numbered in ascending order of $n_s^μ \in \{0, \ldots, N_{subframe}^{slot,μ}-1\}$ in the subframe and in ascending order of $n_{s,f}^μ \in \{0, \ldots, N_{subframe}^{slot,μ}-1\}$ in the radio frame. One slot includes consecutive OFDM symbols of $N_{symb}^μ$, and $N_{symb}^μ$ is determined according to the used numerology and slot configuration. In the subframe, the start of slot $n_s^μ$ is temporally aligned with the start of $n_s^μ N_{symb}^μ$.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,μ}$ of slots per radio frame, and the number $N_{slot}^{subframe,μ}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,μ}$ | $N_{slot}^{subframe,μ}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,μ}$ | $N_{slot}^{subframe,μ}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^μ N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^μ N_{sc}^{RB}$ subcarriers, and $2^μ N_{symb}^{(μ)}$ OFDM symbols, where $N_{RB}^μ \leq N_{RB}^{max,μ}$. $N_{RB}^{max,μ}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, ī), where k=0, . . . , $N_{RB}^μ N_{sc}^{RB}-1$ is an index on a frequency domain, and ī= 0, . . . , $2^μ N_{symb}^{(μ)}-1$ refers to a location of a symbol in a subframe. The index pair (k,l̄) is used to refer to a resource element in a slot, where l=0, . . . , $N_{symb}^{\mu}-1$.

The resource element (k,l̄) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration coincides with 'point A'. A common resource block number $n_{CRB}^{\mu}$ in the frequency domain and resource elements (k, l) for the subcarrier spacing configuration μ may be given by the following Equation 1.

[Equation 1]

$$n_{CRB}^{\mu} = \left\lfloor \frac{k}{N_{sc}^{RB}} \right\rfloor$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start}$$

Here, $N_{BWP,i}^{size}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

Downlink Beam Management (DL BM)

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using a SSB and a CSI-RS.

As illustrated in FIG. 7, a SSB beam and a CSI-RS beam may be used for beam measurement. A measurement metric is L1-RSRP per resource/block. The SSB may be used for coarse beam measurement, and the CSI-RS may be used for fine beam measurement. The SSB may be used for both Tx beam sweeping and Rx beam sweeping. The Rx beam sweeping using the SSB may be performed while the UE changes Rx beam for the same SSBRI across multiple SSB bursts. One SS burst includes one or more SSBs, and one SS burst set includes one or more SSB bursts.

DL BM Related Beam Indication

A UE may be RRC-configured with a list of up to M candidate transmission configuration indication (TCI) states at least for the purpose of quasi co-location (QCL) indication, where M may be 64.

Each TCI state may be configured with one RS set. Each ID of DL RS at least for the purpose of spatial QCL (QCL Type D) in an RS set may refer to one of DL RS types such as SSB, P-CSI RS, SP-CSI RS, A-CSI RS, etc.

Initialization/update of the ID of DL RS(s) in the RS set used at least for the purpose of spatial QCL may be performed at least via explicit signaling.

Table 5 represents an example of TCI-State IE.

The TCI-State IE associates one or two DL reference signals (RSs) with corresponding quasi co-location (QCL) types.

tion. As another example, in order to indicate QCL reference information on PDCCH DMRS antenna port(s), the TCI state ID may be indicated to each CORESET configuration. As another example, in order to indicate QCL reference information on PDSCH DMRS antenna port(s), the TCI state ID may be indicated via DCI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

TABLE 5

```
-- ASN1START
-- TAG-TCI-STATE-START
TCI-State ::=                    SEQUENCE {
    tci-StateId                      TCI-StateId,
    qcl-Type1                        QCL-Info,
    qcl-Type2                        QCL-Info
    ...
}
QCL-Info ::=                     SEQUENCE {
    cell                             ServCellIndex
    bwp-Id                           BWP-Id
    referenceSignal                  CHOICE {
        csi-rs                           NZP-CSI-RS-ResourceId,
        ssb                              SSB-Index
    },
    qcl-Type                     ENUMERATED {typeA, typeB, typeC, typeD},
    ...
}
-- TAG-TCI-STATE-STOP
-- ASN1STOP
```

In Table 5, bwp-Id parameter represents a DL BWP where the RS is located, cell parameter represents a carrier where the RS is located, and reference signal parameter represents reference antenna port(s) which is a source of quasi co-location for corresponding target antenna port(s) or a reference signal including the one. The target antenna port(s) may be CSI-RS, PDCCH DMRS, or PDSCH DMRS. As an example, in order to indicate QCL reference RS information on NZP CSI-RS, the corresponding TCI state ID may be indicated to NZP CSI-RS resource configuration informa- The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

UL BM Procedure

A UL BM may be configured such that beam reciprocity (or beam correspondence) between Tx beam and Rx beam is established or not established depending on the UE implementation. If the beam reciprocity between Tx beam and Rx beam is established in both a base station and a UE, a UL beam pair may be adjusted via a DL beam pair. However, if the beam reciprocity between Tx beam and Rx beam is not established in any one of the base station and the UE, a process for determining the UL beam pair is necessary separately from determining the DL beam pair.

Even when both the base station and the UE maintain the beam correspondence, the base station may use a UL BM procedure for determining the DL Tx beam even if the UE does not request a report of a (preferred) beam.

The UM BM may be performed via beamformed UL SRS transmission, and whether to apply UL BM of a SRS resource set is configured by the (higher layer parameter) usage. If the usage is set to 'BeamManagement (BM)', only one SRS resource may be transmitted to each of a plurality of SRS resource sets in a given time instant.

The UE may be configured with one or more sounding reference symbol (SRS) resource sets configured by (higher layer parameter) SRS-ResourceSet (via higher layer signaling, RRC signaling, etc.). For each SRS resource set, the UE may be configured with K≥1 SRS resources (higher later parameter SRS-resource), where K is a natural number, and a maximum value of K is indicated by SRS capability.

In the same manner as the DL BM, the UL BM procedure may be divided into a UE's Tx beam sweeping and a base station's Rx beam sweeping.

FIG. 8(a) and FIG. 8(b) illustrate an example of a UL BM procedure using an SRS.

More specifically, FIG. 8(a) illustrates an Rx beam determination procedure of a base station, and FIG. 8(b) illustrates a Tx beam sweeping procedure of a UE.

FIG. 9 illustrates an uplink transmission/reception operation to which the method proposed in this disclosure may be applied.

Referring to FIG. 9, a BS schedules uplink transmission such as a frequency/time resource, a transport layer, an uplink precoder, and an MCS (S910). In particular, the BS may determine a beam for a UE to transmit a PUSCH.

The UE receives a DCI for uplink scheduling (i.e., including scheduling information of the PUSCH) on a PDCCH from the BS (S920).

For uplink scheduling, DCI format 0_0 or 0_1 may be used. In particular, DCI format 0_1 includes the following information.

DCI format identifier (identifier for DCI formats), UL/SUL (supplementary uplink) indicator (UL/SUL indicator), bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, uplink shared channel (UL-SCH) indicator.

In particular, SRS resources configured in the SRS resource set associated with the higher layer parameter 'usage' may be indicated by an SRS resource indicator field. In addition, 'spatialRelationInfo' may be set for each SRS resource, and the value may be one of {CRI, SSB, SRI}.

The UE transmits uplink data to the BS on PUSCH (S930).

When the UE detects a PDCCH including DCI format 0_0 or 0_1, it transmits a corresponding PUSCH according to an indication by the corresponding DCI.

For PUSCH transmission, two transmission schemes are supported: codebook-based transmission and non-codebook-based transmission.

i) When the higher layer parameter 'txConfig' is set to 'codebook', the UE is set to codebook-based transmission. Meanwhile, when the higher layer parameter 'txConfig' is set to 'nonCodebook', the UE is set to non-codebook-based transmission. If the higher layer parameter 'txConfig' is not set, the UE does not expect to be scheduled by DCI format 0_1. When the PUSCH is scheduled by DCI format 0_0, PUSCH transmission is based on a single antenna port.

In the case of codebook-based transmission, the PUSCH may be scheduled by DCI format 0_0, DCI format 0_1 or semi-statically. When the PUSCH is scheduled by DCI format 0_1, the UE determines a PUSCH transmission precoder based on SRI, TPMI (Transmit Precoding Matrix Indicator) and transmission rank from DCI, as given by the SRS resource indicator field and the precoding information and number of layers field. The TPMI is used to indicate a precoder to be applied across an antenna port, and corresponds to an SRS resource selected by the SRI when multiple SRS resources are configured. Alternatively, when a single SRS resource is configured, the TPMI is used to indicate a precoder to be applied across the antenna port and corresponds to the single SRS resource. A transmission precoder is selected from the uplink codebook having the same number of antenna ports as the higher layer parameter 'nrofSRS-Ports'.

When the higher layer parameter 'txConfig' set to 'codebook' in the UE is configured, at least one SRS resource is configured in the UE. The SRI indicated in slot n is associated with the latest transmission of the SRS resource identified by the SRI, and here, the SRS resource precedes a PDCCH carrying the SRI (i.e., slot n).

ii) In the case of non-codebook-based transmission, the PUSCH may be scheduled by DCI format 0_0, DCI format 0_1 or semi-statically. When multiple SRS resources are configured, the UE may determine the PUSCH precoder and transmission rank based on the wideband SRI, and here, the SRI is given by the SRS resource indicator in the DCI or by the higher layer parameter 'srs-ResourceIndicator'. The UE uses one or multiple SRS resources for SRS transmission, and here, the number of SRS resources may be configured for simultaneous transmission within the same RB based on UE capability. Only one SRS port is configured for each SRS resource. Only one SRS resource may be set as the higher layer parameter 'usage' set to 'nonCodebook'. The maximum number of SRS resources that may be configured for non-codebook-based uplink transmission is 4. The SRI indicated in slot n is associated with the latest transmission of the SRS resource identified by the SRI, and here, the SRS transmission precedes the PDCCH carrying the SRI (i.e., slot n).

Hereinafter, an M-TRP-related operation to which a method proposed in the present disclosure can be applied will be described.

Multiple Transmission and Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT may be categorized into fully overlapped NCJT, in which time and frequency resources used for transmission by each base station (or TRP) are fully overlapped, and partially overlapped NCJT, in which time and frequency resources used for transmission by each base station (or TRP) are partially overlapped. This is only for convenience of explanation in the present disclosure, and it is needless to say that, in the embodiments and methods to be described below, the above-mentioned terms can be replaced with other terms with the same technical meanings. For example, in the case of partially overlapped NCJT, both data of a first base station (e.g., TRP 1) and data of a second base station (e.g., TRP 2) may be transmitted in some of the time resources and/or frequency resources, and data of only one of the first and second base stations may be transmitted in the remaining time resources and/or frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI).

That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE through separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated through higher layer signaling (e.g., RRC signaling)/L2 signaling (e.g., MAC-CE)/L1 signaling (e.g., DCI).

For example, a ControlResourceSet information element (IE), which is an upper layer parameter, is used to configure a time/frequency control resource set (CORESET). For example, the control resource set may be related to detection and reception of downlink control information. The ControlResourceSet IE may include a CORESET-related ID (e.g. controlResourceSetID), an index of the CORESET pool for CORESET (e.g. CORESETPoolIndex), time/frequency resource configuration of CORESET, TCI information related to the CORESET, and the like. As an example, the index of the CORESET pool (e.g. CORESETPoolIndex) may be configured to 0 or 1. The index of the CORESET Pool may mean a CORESET group ID. For example, the index of the CORESET pool (e.g. CORESETPoolIndex) may correspond to the above-described CORESET group ID.

M-TRP Transmission Scheme

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

Table 6 shows various schemes that can be considered for URLLC M-TRP transmission. Referring to Table 6, there exist various schemes such as SDM/FDM/TDM.

TABLE 6

To facilitate further down-selection for one or more schemes in RAN1#96bis, schemes for multi-TRP based URLLC, scheduled by single DCI at least, are clarified as following:
- Scheme 1 (SDM): n (n<=$N_s$) TCI states within the single slot, with overlapped time and frequency resource allocation
  - Scheme 1a:
    - Each transmission occasion is a layer or a set of layers of the same TB, with each layer or layer set is associated with one TCI and one set of DMRS port(s).
    - Single codeword with one RV is used across all spatial layers or layer sets. From the UE perspective, different coded bits are mapped to different layers or layer sets with the same mapping rule as in Rel-15.
  - Scheme 1b:
    - Each transmission occasion is a layer or a set of layers of the same TB, with each layer or layer set is associated with one TCI and one set of DMRS port(s).
    - Single codeword with one RV is used for each spatial layer or layer set. The RVs corresponding to each spatial layer or layer set can be the same or different.
  - Scheme 1c:
    - One transmission occasion is one layer of the same TB with one DMRS port associated with multiple TCI state indices, or one layer of the same TB with multiple DMRS ports associated with multiple TCI state indices one by one.
  - For Scheme 1a and 1c, the same MCS is applied for all layers or layer sets.
  - For scheme 1b, same or different MCS/modulation orders for different layers or layer sets can be discussed.
- Scheme 2 (FDM): n (n<=$N_f$) TCI states within the single slot, with non-overlapped frequency resource allocation
  - Each non-overlapped frequency resource allocation is associated with one TCI state.
  - Same single/multiple DMRS port(s) are associated with all non-overlapped frequency resource allocations.
  - Scheme 2a:
    - Single codeword with one RV is used across full resource allocation. From UE perspective, the common RB mapping (codeword to layer mapping) is applied across full resource allocation.
  - Scheme 2b:
    - Single codeword with one RV is used for each non-overlapped frequency resource allocation. The RVs corresponding to each non-overlapped frequency resource allocation can be the same or different.
  - For scheme 2a, same MCS is applied for all non-overlapped frequency resource allocations
  - For scheme 2b, same or different MCS/modulation orders for different non-overlapped frequency resource allocations can be discussed.
  - Details of frequency resource allocation mechanism for FDM 2a/2b with regarding to allocation granularity, time domain allocation can be discussed.
- Scheme 3 (TDM): n (n<=$N_{t1}$) TCI states within the single slot, with non-overlapped time resource allocation
  - Each transmission occasion of the TB has one TCI and one RV with the time granularity of mini-slot.
  - All transmission occasion (s) within the slot use a common MCS with same single or multiple DMRS port(s).
  - RV/TCI state can be same or different among transmission occasions.
  - FFS channel estimation interpolation across mini-slots with the same TCI index

TABLE 6-continued

- Scheme 4 (TDM): n (n<=$N_{t2}$) TCI states with K (n<=K) different slots.
  - Each transmission occasion of the TB has one TCI and one RV.
  - All transmission occasion (s) across K slots use a common MCS with same single or multiple DMRS port(s)
  - RV/TCI state can be same or different among transmission occasions.
  - FFS channel estimation interpolation across slots with the same TCI index Note that M-TRP/panel based URLLC schemes shall be compared in terms of improved reliability, efficiency, and specification impact.
Note:
Support of number of layers per TRP may be discussed For example, in relation to the TDM based URLLC scheme, scheme 4 refers to a scheme in which one TRP transmits a TB in one slot, which may increase the probability of data reception through the same TB received from a number of TRPs in a number of slots. Scheme 3 refers to a scheme in which one TRP transmits a TB thorough several consecutive OFDM symbols (i.e., a symbol group), by which a number of TRPs may be configured to transmit the same TB through different symbol groups within one slot.

Method for improving reliability in Multi-TRPs

FIG. 10(a) and FIG. 10(b) illustrate an example of a transmission/reception method for improving reliability using transmission in multiple TRPs.

The example in FIG. 10(a) shows that a layer group transmitting the same codeword (CW)/transport block (TB) correspond to different TRPs. That is, the same CW may be transmitted through different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

Meanwhile, the example in FIG. 10(b) shows an example in which different CWs are transmitted through layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of FIG. 10(b), the code rate corresponding to the TB may be higher than that of FIG. 10(a). Still, there is an advantage that a code rate can be adjusted by indicating different redundancy version (RV) values for encoding bits generated from the same TB according to a channel environment, or that a modulation order of each CW may be adjusted.

In FIG. 10(a) or FIG. 10(b), the same TB is repeatedly transmitted through different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

Random Access Related Procedures

The random access procedure of the UE may be summarized as shown in Table 7 below.

TABLE 7

| | Type of Signal | Operations/Information Acquired |
|---|---|---|
| Step 1 | PRACH preamble in UL | Initial Beam Acquisition<br>Random selection of RA-preamble ID |
| Step 2 | Random Access Response on DL-SCH | Timing alignment information<br>RA-Preamble ID<br>Initial UL Grant, Temporary C-RNTI |
| Step 3 | UL transmission on UL-SCH | RRC connection request<br>UE identifier |
| Step 4 | Contention Resolution on DL | Temporary C-RNTI on PDCCH for initial access<br>C-RNTI on PDCCH for UE in RRC_CONNECTED |

Beam Failure Recovery (BFR)(in 3GPP NR Rel-15)

A beam mismatch problem may occur according to a period of beam management set in performing the DL/UL beam management process. In particular, when a wireless channel environment is changed due to location movement of the UE, rotation of the UE, and/or movement of surrounding objects (for example, a LoS environment is changed to a Non-LoS environment due to beam blocking), a best DL/UL beam pair may be changed, and with respect to such a change, when tracking is unsuccessful by a beam management process performed by a network indication, it may be determined that the beam failure event occurs. The UE may determine whether the beam failure event occurs through a reception quality of a downlink RS and a reporting message for such a situation or a message (hereinafter, referred to as a 'beam failure recovery request (BFRQ) message') for a beam recovery request should be delivered from the UE. The BS that receives the message may perform beam recovery through various processes including beam RS transmission, a beam reporting request, and the like for the beam recovery. Such a series of beam recovery process is referred to as beam failure recovery (BFR). In Rel-15 NR, a beam failure recovery (BFR) process for PCell or PScell (both cells are combined and also are referred to as a special cell (SpCell) in which a contention based PRACH resource continuously exists is standardized, and the corresponding procedure as an operation in a serving cell is constituted by a beam failure detection (BFD) process of the UE, a BFRQ process, and a process in which the UE monitors a response of the BS to BFRQ as follows (see 3GPP TS38.213, TS38.321, and TS38.331).

Beam Failure Detection (BFD)

When all PDCCH beams are falls to a determined quality value (Q_out) or less, it is determined that one beam failure instance occurs (here, the quality is based on hypothetical block error rate (BLER), i.e., when it is assumed that control information is transmitted to the corresponding PDCCH, a probability that demodulation of the corresponding information will be unsuccessful).

Here all PDCCH beams mean that a case where one or more a plurality of search spaces to monitor the PDCCH may be configured in the UE, and the beam may be configured differently for each search space, and in this case, all beams falls below a BLER threshold. As a criterion for judging the BFD RS by the UE, two following schemes are supported.

[implicit configuration of BFD RSs] A control resource set (CORESET [see TS38.213, TS38.214, and TS38.331]) ID which is a resource region in which the PDCCH may be transmitted may be configured in each search space, and RS information (e.g., CSI-RS resource ID, SSB ID) which is subjected to QCL in terms of a spatial RX parameter may be indicated/configured for each CORESET ID (in an NR standard, the QCLed RS is indicated/configured through transmit configuration information (TCI) indication). Here, the QCLed RS in terms of the spatial RX parameter means a method in which the BS announces that the UE should use (or may use) a beam used for corresponding spatially QCLed RS reception as it is in receiving the corresponding PDCCH DMRS. Consequently, in terms of the BS, the QCLed RS is a method that announces, to the UE, transmitting the PDCCH DMRS by applying the same transmission beam or a similar transmission beam (e.g., a case where a beam direction is the same/similar and a beam width is different) between spatially QCLed antenna ports).

[explicit configuration of BFD RSs] The BS may explicitly configure a beam RS(s) for the usage (beam failure detection), and in this case, the corresponding beam RS(s) corresponds to the 'all PDCCH beams'.

Each time an event occurs in which the hypothetical BLER measured based on the BFD RS(s) in a UE physical layer deteriorates to a specific threshold or more, it is announced to an MAC sub layer that the 'beam failure instance (BFI)' occurs, and when the BFI occurs as large as a predetermined count (beamFailureInstanceMaxCount) within a predetermined time (BFD timer), the MAC sub layer determines that the beam failure occurs, and initiates a related RACH operation.

Hereinafter, an MAC layer operation related to the BFD will be described.

The MAC entity:
1> when a beam failure instance indication is received in lower layers:
2> starts or starts again beamFailureDetectionTimer
2> increases BFI_COUNTER by 1
2> when BFI_COUNTER>=beamFailureInstanceMaxCount:
3> initiates a random access procedure in SpCell
1> when beamFailureDetectionTimer expires; or
1> when beamFailureDetectionTimer, beamFailureInstanceMaxCount or any of the reference signals used for beam failure detection is reconfigured by a higher layer:
2> configures BFI_COUNTER to 0
1> when the random access procedure is successfully completed:
2> configures BFI_COUNTER to 0
2> stops (configured) beamFailureRecoveryTimer
2> regards that the beam failure recovery procedure is successfully completed BFRQ (based on PRACH): New beam identification+PRACH transmission When BFIs of a predetermined number or more occur as described above, the UE may determine that the beam failure occurs, and perform the beam failure recovery operation. As an example of the beam failure recovery operation, a beam failure recovery request (BFRQ) operation based on an RACH procedure (i.e., PRACH) may be performed. Hereinafter, the corresponding BFRQ procedure will be described in detail.

The BS may configure, to the UE, an RS list (candidate-BeamRSList) corresponding to candidate beams which may be replaced upon occurrence of the BF through RRC, and dedicated PRACH resources may be configured for the corresponding candidate beams. Here, the dedicated PRACH resources are characteristics to be non-contention based PRACH (will also be referred to as contention free PRACH) resources, and when the beam may not be found in the corresponding list, the beam is selected among predetermined SSB resources to transmit the contention based PRACH. A specific procedure is as follows.

Step 1) The UE finds a beam having a predetermined quality value (Q_in) or more among RSs configured as a candidate beam RS set by the B.

When one beam RS exceeds a threshold, the corresponding beam RS is selected

When a plurality of beam RSs exceeds a threshold, one random beam RS is selected among the corresponding beam RSs When there is no beam which exceeds the threshold, Step 2 is performed Note1: Here, a beam quality is based on RSRP
Note2: There are three cases for the RS beam set configured by the BS 1) All beam RSs in the RS beam set are constituted by SSBs 2) All beam RSs in the RS beam set are constituted by CSI-RS resources 3) All beam RSs in the RS beam set are constituted by the SSBs and the CSI-RS resources Step 2) The UE finds a beam having a predetermined quality value (Q_in) or more among SSBs (connected to the contention based PRACH resource)

When one SSB exceeds a threshold, the corresponding beam RS is selected

When a plurality of SSBs exceeds a threshold, one random beam RS is selected among the corresponding beam RSs When there is no beam which exceeds the threshold, Step 3 is performed Step 3) The UE selects a random SSB among the SSBs (connected to the contention based PRACH resource)

The UE transmits, to the BS, a PRACH resource and preamble directly or indirectly connected and configured to the beam RS (CSI-RS or SSB) selected in such a process.

Here, the direct connection configuration is used in following case 1) or 2).

1) Case where a contention-free PRACH resource and preamble is configured for a specific RS within a candidate beam RS set separately configured for the BFR usage 2) Case where (contention based) PRACH resources and preambles mapped to SSBs universally for the other usage such as a random access, etc., are configured Here, the indirect connection configuration is used in the following case.

Case where the contention-free PRACH resource and preamble is not configured for the specific RS within the candidate beam RS set separately configured for the BFR usage In this case, the UE selects a (contention-free) PRACH resource and preamble connected to an SSB designated to be received with the same receive beam as the corresponding CSI-RS (i.e., quasi-co-located(QCLed) with respect to spatial Rx parameter).

Monitoring of gNB's Response to the BFRO

The UE monitors a response of the BS (gNB) to the corresponding PRACH transmission.

Here, the response to the contention-free PRACH resource & preamble is transmitted to a PDCCH masked with a C-RNTI, and this is received in a search space RRC-configured separately fro the BFR.

The search space is configured in a specific CORESET (for the BFR).

In a response to the contention PRACH, CORESET (e.g., CORESET 0 or CORESET 1) and a search space configured for a general contention PRACH based random access process are reused as they are.

When there is no response for a predetermined time, a new beam identification & selection process and a BFRQ & monitoring gNB's response process are repeated.

The processes may be performed until a predetermined maximum number of times of the PRACH transmission is reached or a configured timer (BFR timer) expired.

When the timer expired, the UE stops the contention free PRACH transmission, but contention based PRACH transmissions by SSB selection may be performed until N_max is reached.

FIG. 11 is a diagram for describing a beam failure recovery related operation to which a method proposed in the present disclosure may be applied. Specifically, FIG. 11 illustrates a beam failure recovery operation in a primary cell (PCell).

Beam Failure Recovery (BFR)(in 3GPP NR Rel-16)

As described above, the PRACH-based BFR procedure was standardized in Rel-15 NR, but due to technical limitations, it is limitedly applied only to PCell or PSCell. Specifically, In the case of the PRACH based BFR procedure to which carrier aggregation (CA) is applied, any SCell may have no UL carrier, and there is a technical limit that even though the SCell has the UL carrier, a contention based PRACH may not be configured. Accordingly, the PRACH based BFR procedure to which the carrier aggregation (CA) is applied is limitedly only to the PCell or PSCell.

The following problem occurs due to an application limitation of the PRACH based BFR procedure. When a high-frequency band (e.g., 30 GHz) is operated by the SCell while the PCell is operated at a low-frequency band (e.g., 6 GHz or less), a problem in that the BFR may not be supported in a high-frequency band in which the BFR support is more importantly affected occurs.

Due to the reason, standardization for the BFR support for a secondary cell (SCell) is in progress in an Rel-16 NR MIMO work item. As a result, the following matter may be considered.

UL transmission to the corresponding SCell is impossible at least for DL only SCell. Accordingly, a (dedicated) PUCCH resource(s) used for announcing, to the BS, that the beam failure occurs in the corresponding SCell may be configured in a special cell (SpCell). The beam failure recovery request (BFRQ) for the SCell may be performed based on the configured PUCCH resources.

Hereinafter, for convenience of description, the PUCCH configured for the beam failure recovery of the SCell will be referred to as BFR-PUCCH. The terminology is used for distinguishing from another PUCCH in terms of understanding appreciation, and a technical scope is not intended to be limited through the corresponding terminology.

A role of the BFR-PRACH is to transmit, to the BS, both 'occurrence of beam failure and new beam RS (Set) information'.

On the contrary, a role of the BFR-PUCCH is to announce, to the BS, only beam failure occurrence for SCell(s)'. Detailed information related to the beam failure which occurs may be transmitted as a subsequent report.

As an example, the UE may transmit, to the BS, MAC CE (or UCI) including information on at least one of i) to iii) below as the subsequent report.

i) SCell(s) in which beam failure occurs (e.g., CC index(s))

ii) Whether there is a new beam for the SCell(s) in which the beam failure occurs iii) When there is the new beam, corresponding beam RS ID(+quality)

The iii) may include information on a quality (RSRP or SINR) of the new beam(s) according to the beam RS ID(s).

Subsequent beam report should not be continuously triggered. Specifically, after the BS receives the BFR-PUCCH, it is also possible for the BS to deactivate SCell(s) in which the BFR is configured for the corresponding UE.

Such an operation is to increase UL resource utilization. Specifically, there is also a case where tens of SCells are connected to one PCell/PSCell, and there may be many UEs sharing one PCell/PSCell UL in terms of the BS. When even such a case is considered, it is preferable to minimize a UL resource amount reserved for an SCell BFRQ usage to each UE in the PCell/PSCell. Accordingly, the BS may deactivate the SCell(s) in which the beam failure occurs after receiving the BFR-PUCCH.

Hereinafter, matters related to a control resource set (COntrol REsource SET, CORESET) to which the method proposed in the present disclosure can be applied will be described.

Table 8 below is a COntrol REsource Set (CORESET) related IE (Information Element) defined in TS 38.331 Radio Resource Control (RRC) Protocol specification.

TABLE 8

ControlResourceSet field descriptions cce-REG-MappingType
Mapping of Control Channel Elements (CCE) to Resource Element Groups (REG) (see
TS 38.211 [16], clauses 7.3.2.2 and 7.4.1.3.2).
controlResourceSetId
Value 0 identifies the common CORESET configured in MIB and in
ServingCellConfigCommon (controlResourceSetZero) and is hence not used here in the
ControlResourceSet IE. Values 1..maxNrofControlResourceSets-1 identify CORESETs
configured by dedicated signalling or in SIB1. The controlResourceSetId is unique
among the BWPs of a serving cell.
duration TABLE 8-continued Contiguous time duration of the CORESET in number of symbols (see TS 38.211 [16], clause 7.3.2.2).
frequencyDomainResources
Frequency domain resources for the CORESET. Each bit corresponds a group of 6 RBs, with grouping starting from the first RB group (see TS 38.213 [13], clause 10.1) in the BWP. The first (left-most / most significant) bit corresponds to the first RB group in the BWP, and so on. A bit that is set to 1 indicates that this RB group belongs to the frequency domain resource of this CORESET. Bits corresponding to a group of RBs not fully contained in the bandwidth part within which the CORESET is configured are set to zero (see TS 38.211 [16], clause 7.3.2.2).
interleaverSize
Interleaver-size (see TS 38.211 [16], clause 7.3.2.2).
pdcch-DMRS-ScramblingID
PDCCH DMRS scrambling initialization (see TS 38.211 [16], clause 7.4.1.3.1). When the field is absent the UE applies the value of the physCellId configured for this serving cell.
precoderGranularity
Precoder granularity in frequency domain (see TS 38.211 [16], clauses 7.3.2.2 and 7.4.1.3.2).
reg-BundleSize
Resource Element Groups (REGs) can be bundled to create REG bundles. This parameter defines the size of such bundles (see TS 38.211 [16], clause 7.3.2.2).
shiftIndex
When the field is absent the UE applies the value of the physCellIdconfigured for this serving cell (see TS 38.211 [16], clause 7.3.2.2).
tci-PresentInDCI
This field indicates if TCI field is present or absent in DL-related DCI. When the field is absent the UE considers the TCI to be absent/disabled. In case of cross carrier scheduling, the network sets this field to enabled for the ControlResourceSet used for cross carrier scheduling in the scheduling cell (see TS 38.214 [19], clause 5.1.5).
tci-StatesPDCCH-ToAddList
A subset of the TCI states defined in pdsch-Config included in the BWP-DownlinkDedicated corresponding to the serving cell and to the DL BWP to which the ControlResourceSet belong to. They are used for providing QCL relationships between the DL RS(s) in one RS Set (TCI-State) and the PDCCH DMRS ports (see TS 38.213 [13], clause 6.). The network configures at most maxNrofTCI-StatesPDCCH entries.

| Conditional Presence | Explanation |
| --- | --- |
| NotSIB1-initialBWP | The field is absent in SIB1 and in the PDCCH-ConfigCommon of t BWP in ServingCellConfigCommon, if SIB1 is broadcasted. Other optionally present, Need N. |

– ControlResourceSetId
The ControlResourceSetId IE concerns a short identity, used to identify a control resource set within a serving cell. The ControlResourceSetId = 0 identifies the ControlResourceSet#0 configured via PBCH (MIB) and in controlResourceSetZero (ServingCellConfigCommon). The ID space is used across the BWPs of a Serving Cell. The number of CORESETs per BWP is limited to 3 (including common and UE-specific CORESETs).
                         ControlResourceSetId information element
-- ASN1START
-- TAG-CONTROLRESOURCESETID-START
ControlResourceSetId ::=              INTEGER (0..maxNrofControlResourceSets-1)
-- TAG-CONTROLRESOURCESETID-STOP
-- ASN1STOP
    – ControlResourceSetZero
The IE ControlResourceSetZero is used to configure CORESET#0 of the initial BWP (see TS 38.213 [13], clause 13).
                         ControlResourceSetZero information element
-- ASN1START
-- TAG-CONTROLRESOURCESETZERO-START
ControlResourceSetZero ::=           INTEGER (0..15)
-- TAG-CONTROLRESOURCESETZERO-STOP
-- ASN1STOP The above-described contents (3GPP system, frame structure, NR system, beam failure recovery procedure (Rel-15/16), etc.) may be applied in combination with the methods proposed in the present disclosure to be described later, or supplemented to clarify the technical features of the methods proposed in the present disclosure. Methods to be described below are only divided for convenience of description, and it is needless to say that some components of one method may be substituted with some components of another method, or may be applied in combination with each other.

If the BFR operation defined in NR Rel-15/16 is applied to the multi-TRP transmission environment as it is, when all CORESETs transmitting the PDCCH in a specific TRP are in a beam failure situation but there is a CORESET other than beam failure among CORESETs that transmit PDCCH in other TRPs, the UE does not determine that it is a beam failure (BF) situation. To solve this problem, the TRP-specific BFR method is under discussion in standardization. In BFR considering M-TRP, it is necessary to consider both a case in which BF occurs only in a specific TRP in a certain CC/BWP and a case in which BF occurs in the corresponding CC/BWP itself (that is, the case in which BF occurs for all TRPs). In the present disclosure, in particular, a method and a UE operation for supporting TRP-specific BFR are proposed by configuring a separate BFRQ resource (PUCCH) for each TRP.

In the present disclosure, '/' means 'and', 'or', or 'and/or' depending on the context.

Among the methods in which a plurality of TRP/panel perform cooperative transmission to a single UE, there are mainly two approaches to support a method also called independent layer joint transmission (ILJT) or non-coherent joint transmission (NCJT).

One is a method in which each of a plurality of TRP/panel transmits the PDCCH, respectively, to cooperatively transmit data to the UE (multi-PDCCH based approach). The other is a method in which only one TRP/panel transmits the PDCCH, but the plurality of TRP/panel/beams participate in PDSCH transmission to cooperatively transmit data (single PDCCH based approach).

When applying the Multi-PDCCH based approach, each TRP/panel independently transmits DCI to the corresponding UE, whereby an independent PDSCH may be scheduled.

When overlap occurs in the time/frequency domain between the corresponding PDSCHs, ILJT transmission may be supported in the overlapping area in the following form.

In terms of the UE, ILJT transmission may be supported in a form that some layer groups are transmitted through a specific TRP/panel, and different layer groups are transmitted through different TRP/panel.

That is, in the same CC/BWP, different TRP/panel may transmit the PDCCH, respectively, and PDSCHs scheduled through the corresponding PDCCHs may overlap in the time/frequency domain.

In order for this operation to be supported even in a non-ideal backhaul environment where cooperation between TRP/panel is difficult to achieve very closely, the time/frequency resource domains where each TRP/panel can transmit PDCCH must be separated. Therefore, in the NR system, a CORESET group in which each TRP/panel transmits a PDCCH may be separated.

If a beamforming technique is applied to each PDCCH transmission, beams for different CORESETs in each CORESET group may be configured/indicated differently. The beam may mean at least one of a TCI state, a Source/QCL RS (e.g. CSI-RS/SSB), a spatial Tx filter, or a spatial Tx parameter.

In the above case, an operation based on a characteristic related to the CORESET group may be configured.

As a characteristic related to the CORESET group, Type-D QCL RS (e.g. spatial relation related RS (e.g. CSI-RS/SSB)) indicated in the TCI state of CORESET may be different, but it may be considered that CORESETs belonging to the same CORESET group are transmitted in the same TRP/panel. Based on this, operations related to HARQ, UCI reporting handling, PUCCH/PUSCH collision handling, PDSCH rate matching, power control, etc. may be configured to be managed/performed in units of CORESET group.

When the existing beam failure recovery operation (BFR operation defined in NR Rel-15) is directly applied to the above-described multi-PDCCH based NCJT environment as it is, the following problems may occur.

All CORESETs belonging to a specific TRP are beam failure situations, but if there is a CORESET other than beam failure among CORESETs belonging to other TRPs, the UE does not determine that it is a beam failure (BF) situation. At this time, the all beam failed TRP may be the TRP (e.g. Primary TRP) that was in charge of transmission of important control information (e.g. SIB, RA, Paging). Even if another TRP (e.g. secondary TRP) (a specific beam of) is in a non-BF situation, a problem occurs in that the corresponding UE cannot receive important control information.

In order to solve this problem, discussion on the introduction of a standard for TRP-specific BFR was conducted (see Table 9 below for a discussion of Rel-17 standardization).

Table 9 below is agreements related to the TRP-specific beam failure recovery (TRP-specific BFR). Embodiments (Proposal 1) of the present disclosure to be described later may be applied to UE/base station operation (e.g. configuration information related to beam failure recovery, BFRQ transmission, BFR MAC-CE transmission, etc.) in combination with all or some of the agreements according to Table 9 below.

TABLE 9

@RAN1 #102e
Agreement
- Evaluate enhancement to enable per-TRP based beam failure recovery starting with Rel-15/16 BFR as the baseline.
- Consider following potential enhancement aspects to enable per-TRP based beam failure recovery
  - Issue 1: TRP-specific BFD
  - Issue 2: TRP-specific new candidate beam identification
  - Issue 3: TRP-specific BFRQ
  - Issue 4: gNB response enhancement
  - Issue 5: UE behavior on QCL/spatial relation assumption/UL power control for DL and UL channels/RSs after receiving gNB response @RAN1 #103e
Agreement
- For M-TRP beam failure detection, support independent BFD-RS configuration per-TRP, where each TRP is associated with a BFD-RS set.
  - FFS: The number of BFD RSs per BFD-RS set, the number of BFD-RS sets, and number of BFD RSs across all BFD-RS sets per DL BWP
  - Support at least one of explicit and implicit BFD-RS configuration
    - With explicit BFD-RS configuration, each BFD-RS set is explicitly configured
      - FFS: Further study QCL relationship between BFD-RS and CORESET
    - FFS: How to determine implicit BFD-RS configuration, if supported

TABLE 9-continued

- For M-TRP new beam identification
  - Support independent configuration of new beam identification RS (NBI-RS) set per TRP if NBI-RS set per TRP is configured
    - FFS: detail on association of BFD-RS and NBI-RS
    - Support the same new beam identification and configuration criteria as Rel.16, including L1-RSRP, threshold Agreement
Support TRP-specific BFD counter and timer in the MAC procedure
- The term TRP is used only for the purposes of discussions in RAN1 and whether/how to capture this is FFS Agreement
- Support a BFRQ framework based on Rel.16 SCell BFR BFRQ
  - In RAN1#104-e, select one from the following options
    - Option 1: Up to one dedicated PUCCH-SR resource in a cell group
      - A cell group refers to either MCG, SCG, or PUCCH cell group
      - FFS: number of spatial filters associated with the PUCCH-SR resources
      - FFS: How the SR configuration is done
    - Option 2: Up to two (or more) dedicated PUCCH-SR resources in a cell group
      - A cell group refers to either MCG, SCG, or PUCCH cell group
      - FFS: whether each PUCCH-SR resource is restricted to be associated to one spatial filter
      - FFS: How the SR configuration is done
  - FFS: Whether no dedicated PUCCH-SR resource can be supported in addition to Option 1 or Option 2
- Study whether and how to provide the following information in BFRQ MAC-CE
  - Index information of failed TRP(s)
  - CC index (if applicable)
  - New candidate beam index (if found)
  - Indication whether new beam(s) is found
  - FFS: whether/how to incorporate multi-TRP failure In summary, it was agreed to support TRP-specific BFR by enhancing Rel-16 PUCCH-based BFR. Based on this, the following operations may be defined/configured.

Beam failure detection RS set (BFD-RS set) for beam failure monitoring/detection may be configured to be TRP-specific. That is, a specific BFD-RS set may explicitly/implicitly indicate a specific TRP. Hereinafter, in the present disclosure, TRP may be interpreted as meaning a BFD-RS set, and conversely, BFD-RS set may be interpreted as meaning TRP. As an example, a PUCCH resource related to a specific TRP may be interpreted as a PUCCH resource related to a specific BFD-RS set.

NBI-RS set that configures a candidate beam for new beam identification may be configured to be TRP-specific. As an example, an NBI-RS set corresponding to the BFD-RS set may be configured. As an example, an NBI-RS set associated with each BFD-RS set may be configured.

In addition, when the TRP-specific BFR is declared, the PUCCH resource in which the UE informs the base station of the BFR may be based on a single PUCCH resource (e.g. up to single PUCCH resource within a cell group) or a plurality of PUCCH resources (e.g. up to two PUCCH resources within a cell group).

Both methods have advantages and disadvantages. In the case of the up to single PUCCH resource method, there is an advantage that SR PUCCH resources can be saved. On the other hand, in the case of the up to two PUCCH resource method, there is an advantage of being able to inform the base station through PUCCH transmission which TRP is in a beam failure (BF) situation. Specifically, since the SR PUCCH (resource) corresponding to each TRP is configured, a TRP in a beam failure situation (BF) may be determined based on the PUCCH (resource) used for the BFR declaration (BFRQ transmission).

However, the current M-TRP transmission may be performed in both PCell (or SpCell) and SCell. Accordingly, the following situation may be assumed in relation to BF occurring for each TRP.

First Cell (e.g. Cell #1): TRP 1 (BF O), TRP 2 (BF X)

Second Cell (e.g. Cell #2): TRP 1 (BF X), TRP 2 (BF O)

Third cell (e.g. Cell #3): TRP 1 (BF O), TRP 2 (BF O)

As described above, when the TRP (e.g. BFD-RS set) in which BF occurs is different for each cell, the following problems may occur.

In terms of the UE operation, ambiguity may occur which PUCCH resource of the two PUCCH resources should be utilized for BFR (BFRQ transmission).

The present disclosure proposes a method and a UE operation for supporting TRP-specific BFR to solve the above problem. In the present disclosure, "occurrence of beam failure (BF)" may mean that BF is detected based on measurement of a BFD-RS set configured for beam failure detection.

[Proposal 1]

Hereinafter, when X (SR) PUCCH resources are configured in a cell group for a beam failure recovery request (BFRQ), a method for transmitting a TRP specific BFRQ will be described.

The UE may transmit the BFR PUCCH according to the number of dedicated (SR) PUCCH resources for the BFRQ purpose configured in the SpCell in the corresponding cell group. Specifically, the UE may transmit the BFR PUCCH based on at least one of the following embodiments i) to ii). The SpCell may mean a special cell defined for a cell group. The SpCell may include a Primary Cell (PCell) for a Master Cell Group (MCG) and/or a Primary Secondary Cell (PS-Cell) for a Secondary Cell Group (SCG).

Embodiment i

It may be assumed that there is one dedicated (SR) PUCCH resource for the (TRP-specific) BFRQ purpose configured in the SpCell within a specific cell group. The UE/base station may operate based on at least one of the following i-1) or i-2).

i-1)

It may be assumed a case in which S-TRP transmission is performed in the SpCell (in a specific BWP). As an example, only one control resource set pool (CORESET pool) or only one beam failure detection RS set/group (BFD RS set/group) may be configured in the corresponding SpCell. In this case, the UE/base station may operate based on at least one of the following a) or b).

a) BF (Beam Failure) may occur in the SpCell. Specifically, it may be determined that all BFD RSs are failures in a specific BWP within the SpCell. In this case, the UE may request BFR (i.e. transmit BFRQ) to the base station through a Rel-15-based PRACH-based BFR procedure. Thereafter, a subsequent operation between base station and UE (gNB response and UE behavior regarding DL/UL beam update) may be performed.

Unlike Rel-15 BFR operation, BFR MAC-CE may be transmitted to the base station (through Msg3/5). Information on failed TRP (i.e. TRP in which BF is detected) for each cell may be included in the corresponding BFR MAC-CE message. Since the BFD-RS set may be configured to be TRP-specific, the information on the TRP in which the BF is detected may be interpreted as information on the BFD-RS set in which the BF is detected.

b) BF may not occur in the SpCell, and (TRP-specific) BF may occur in the SCell(s) in the cell group other than the SpCell. In this case, the UE may request BFR (i.e. transmit BFRQ) to the base station by utilizing one dedicated (SR) PUCCH resource preconfigured for the BFRQ purpose. Thereafter, a subsequent operation between the base station and UE (based on the PUCCH-based BFR procedure) may be performed. Specifically, the following operations 1) to 3) may be performed.

1) PUSCH scheduling based on gNB response (e.g. DCI)
2) BFRQ MAC CE transmission in PUSCH (indicates that a specific TRP (specific BFD-RS set) (or specific CORESET pool index/specific CORESET group) in the SCell is in the BF situation)
3) DL/UL beam update In the BFRQ MAC CE transmission of the UE, information on a failed TRP for each cell (i.e. TRP in which BF is detected) may be included in the corresponding message.

The combination of operation a) and operation b) may be applied to a UE/base station operation.

i-2)

It may be assumed that M-TRP transmission is performed in the SpCell (in a specific BWP). As an example, a plurality of CORESET pools or a plurality of beam failure detection RS sets/groups (BFD RS set/groups) may be configured in the corresponding SpCell. In this case, the UE/base station may operate based on at least one of the following a) or b).

a) BF may occur only in some TRPs in the SpCell. Specifically, it may be determined that all BFD RSs in one specific BFD-RS set in a specific BWP within the SpCell are failures. In this case, the UE may request BFR (i.e. transmit BFRQ) to the base station by utilizing one dedicated (SR) PUCCH resource preconfigured for the BFRQ purpose. Thereafter, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may be included in the corresponding message.

On the other hand, BF may occur for all TRPs in the SpCell. Specifically, it may be determined that BFD RSs for all BFD RS sets in a specific BWP within the SpCell are failures. In this case, the UE may request BFR (i.e. transmit BFRQ) to the base station through a Rel-15-based PRACH-based BFR procedure. Thereafter, a subsequent operation between the base station and the UE (gNB response and UE behavior regarding DL/UL beam update) may be performed.

Unlike Rel-15 BFR operation, BFR MAC-CE may be transmitted to the base station (through Msg3/5). In the corresponding BFR MAC-CE message, information on failed TRP (i.e. TRP in which BF is detected) for each cell may be included.

b) BF may not occur in all TRPs of the SpCell, and BF of a specific TRP (e.g. TRP-specific BF) and/or BF in all TRPs (e.g. cell-specific BF) may occur in the SCell(s) in the cell group other than the SpCell. In case of the above, a TRP-specific beam failure recovery (TRP-specific BFR) and/or a tpf-specific beam failure recovery (cell-specific BFR) operation may be performed.

Specifically, the UE may request BFR (i.e. transmit BFRQ) to the base station based on one preconfigured dedicated (SR) PUCCH resource for the BFRQ purpose. Thereafter, a subsequent operation (based on the PUCCH-based BFR procedure) between the base station and UE (see 1) to 3) of i-1) b) above) may be performed.

In terms of implementation, the combination of the operation a and the operation b may be applied to the UE/base station operation.

Embodiment ii

It may be assumed that there are two or more dedicated (SR) PUCCH resources for the (TRP-specific) BFRQ purpose configured in the SpCell within a specific cell group.

A specific PUCCH resource among a plurality of dedicated (SR) PUCCH resources configured for the BFRQ purpose may be connected to/mapped to/associated with at least one of the following 1), 2) or 3) (for each CC/BWP).

1) specific TRP (e.g. specific beam failure detection RS set (specific BFD-RS set))
2) specific control resource set pool index (specific CORESETPoolIndex)
3) a subset of all control resource sets within the bandwidth part (BWP) (and/or CORESET group index) (subset of all CORESET within BWP (and/or CORESET group index))

The UE/base station may operate based on at least one of the following ii-1) or ii-2).

ii-1)

It may be assumed a case in which S-TRP transmission is performed (in a specific BWP) in the SpCell. As an example, only one control resource set pool (CORESET pool) may be configured in the corresponding SpCell, or only one beam failure detection RS set/group (BFD RS set/group) may be configured. In this case, the UE/base station may operate based on at least one of the following a) or b).

a) BF (Beam Failure) may occur in the SpCell. Specifically, it may be determined that all BFD RSs are failures in a specific BWP within the SpCell. In this case, the UE may request BFR (i.e. transmit BFRQ) to the base station through a Rel-15-based PRACH-based BFR procedure. Thereafter, a subsequent operation between the base station and UE (gNB response and UE behavior regarding DL/UL beam update) may be performed.

Unlike Rel-15 BFR operation, BFR MAC-CE may be transmitted to the base station (through Msg3/5). Information on failed TRP (i.e. TRP in which BF is detected) for each cell may be included in the corresponding BFR MAC-CE message.

b) BF may not occur in the SpCell, and TRP-specific BF and/or all TRP BF (or cell-specific BF) may occur in the SCell in the cell group other than the SpCell. The UE may operate based on at least one of Example 1) or Example 2) below to determine a PUCCH resource to request BFR (i.e. PUCCH resource for BFRQ transmission).

Example 1) It may be assumed that BF occurs in a single SCell, and the corresponding BF occurs in a specific TRP within the SCell in which the BFR procedure is triggered.

The UE may transmit the BFRQ to the base station through the PUCCH resource related to the corresponding TRP (or TRP in which BF does not occur) among the two PUCCH resources (configured in the SpCell).

As an example, the UE may request BFR (i.e. transmit BFRQ) to the base station through the PUCCH resource of the SpCell related to a specific CORESETPoolIndex (and/or CORESET group index). The specific CORESETPoolIndex (and/or CORESET group index) may be related to the specific TRP.

As an example, the UE may transmit the BFRQ to the base station through the PUCCH resource associated with the BFD-RS set in which the beam failure is detected.

Thereafter, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may not be included in the corresponding message.

On the other hand, it may be assumed that BF occurs in a single SCell, and the BF occurs in all TRPs within the SCell in which the BFR procedure is triggered. In this case, the UE may request BFR (i.e. transmit BFRQ) to the base station by utilizing one of the two PUCCH resources (configured in the SpCell) or by utilizing the PUCCH resource selected according to a specific rule.

As an example, the PUCCH resource selected according to the specific rule may be defined based on at least one of the following examples.

'PUCCH of lowest index'

PUCCH in which 'PUCCH-spatialRelationInfo of lowest index' is configured/activated PUCCH in which 'TCI-state of lowest index' is configured/activated/indicated After the BFRQ transmission of the UE, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may be included in the corresponding message. Or/and there may be a PUCCH resource pre-defined by the base station configuration in the message. For example, the base station may configure a primary PUCCH resource among a plurality of dedicated (SR) PUCCH resources.

Example 2) It may be assumed that BF occurs in a plurality of SCells, and the corresponding BF occurs in a specific TRP within the SCell(s) in which the BFR procedure is triggered.

The UE may transmit the BFRQ to the base station through the PUCCH resource related to the corresponding TRP (or TRP in which BF does not occur) among the two PUCCH resources (configured in the SpCell).

As an example, the UE may request BFR (i.e. transmit BFRQ) to the base station through the PUCCH resource of the SpCell related to a specific CORESETPoolIndex (and/or CORESET group index). The specific CORESETPoolIndex (and/or CORESET group index) may be related to the specific TRP.

As an example, the UE may transmit the BFRQ to the base station through the PUCCH resource associated with the BFD-RS set in which the beam failure is detected.

Thereafter, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may not be included in the corresponding message.

On the other hand, it may be assumed that BF occurs in a plurality of SCells, and the failed TRP (i.e. TRP in which BF is detected) is different for each SCell in the SCell(s) in which the BFR procedure is triggered (Example: when both-TRP (TRP 1/2) fails in SCell #1, TRP 1 fails in SCell #2, and TRP 2 fails in SCell #3).

Among the SCell (s), the UE may request BFR (i.e. transmit BFRQ) to the base station by utilizing the PUCCH resource related to the TRP determined based on the number of beam failure detections or the PUCCH resource selected according to a specific rule.

The TRP determined based on the number of beam failure detection may mean a TRP in which a beam failure is detected a greater number of times (that is, a TRP with the highest number of beam failure detections) or a TRP in which a beam failure is detected a small number of times (that is, a TRP with the fewest number of beam failure detections).

As an example, the PUCCH resource related to the TRP determined based on the number of beam failure detection may be a PUCCH resource of SpCell associated with a specific CORESETPoolIndex (and/or CORESET group index). The specific CORESETPoolIndex (and/or CORESET group index) may be related to the determined TRP.

As an example, the PUCCH resource selected according to the specific rule may be defined based on at least one of the following examples.

'PUCCH of lowest index'

PUCCH in which 'PUCCH-spatialRelationInfo of lowest index' is configured/activated PUCCH in which 'TCI-state of lowest index' is configured/activated/indicated After the BFRQ transmission of the UE, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may be included in the corresponding message. Or/and there may be a PUCCH resource pre-defined by the base station configuration. For example, the base station may configure a primary PUCCH resource among a plurality of dedicated (SR) PUCCH resources.

The combination of operation a) and operation b) may be applied to the UE/base station operation.

ii-2)

It may be assumed that M-TRP transmission is performed in the SpCell (in a specific BWP). As an example, a plurality of CORESET pools or a plurality of beam failure detection RS sets/groups (BFD RS set/groups) may be configured in the corresponding SpCell. In this case, the UE/base station may operate based on at least one of the following a), b) or c).

a) BF may occur for all TRPs in the SpCell. Specifically, it may be determined that BFD RSs for all BFD RS sets in a specific BWP within the SpCell are failures. In this case, the UE may request BFR (i.e. transmit BFRQ) to the base station through a Rel-15-based PRACH-based BFR procedure. Thereafter, a subsequent operation between the base station and the UE (gNB response and UE behavior regarding DL/UL beam update) may be performed.

Unlike Rel-15 BFR operation, BFR MAC-CE may be transmitted to the base station (through Msg3/5). Information on failed TRP (i.e. TRP in which BF is detected) for each cell may be included in the corresponding BFR MAC-CE message. For example, the information on the failed TRP (i.e. TRP in which BF is detected) for each cell may mean information on the BFD-RS set in which BF is detected among the plurality of BFD-RS sets for each cell.

b) TRP-specific BF may occur in the SpCell, and additionally, TRP-specific BF and/or all TRP BF (or cell-specific BF) may occur in the SCell in the cell group other than the SpCell. The UE may operate as follows to determine a PUCCH resource to request BFR (i.e. a PUCCH resource for BFRQ transmission).

Example 1) It may be assumed that the BF occurs in a specific TRP within the SpCell in which the BFR procedure is triggered. The UE may transmit the BFRQ to the base station through the PUCCH resource related to the corresponding TRP (or TRP in which BF does not occur) among the two PUCCH resources (configured in the SpCell).

As an example, the UE may request BFR (i.e. transmit BFRQ) to the base station through the PUCCH resource of the SpCell related to a specific CORESETPoolIndex (and/or CORESET group index). The specific CORESETPoolIndex (and/or CORESET group index) may be related to the specific TRP.

As an example, the UE may transmit the BFRQ to the base station through the PUCCH resource associated with the BFD-RS set in which the beam failure is detected.

Thereafter, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may not be included in the corresponding message.

b) BF may not occur in the SpCell, and TRP-specific BF and/or all TRP BF (or cell-specific BF) may occur in the SCell in the cell group other than the SpCell. The UE may operate based on at least one of Example 1) or Example 2) below to determine a PUCCH resource to request BFR (i.e. PUCCH resource for BFRQ transmission).

Example 1) It may be assumed that BF occurs in a single SCell, and the corresponding BF occurs in a specific TRP within the SCell in which the BFR procedure is triggered.

The UE may transmit the BFRQ to the base station through the PUCCH resource related to the corresponding TRP (or TRP in which BF does not occur) among the two PUCCH resources (configured in the SpCell).

As an example, the UE may request BFR (i.e. transmit BFRQ) to the base station through the PUCCH resource of the SpCell related to a specific CORESETPoolIndex (and/or CORESET group index). The specific CORESETPoolIndex (and/or CORESET group index) may be related to the specific TRP.

As an example, the UE may transmit the BFRQ to the base station through the PUCCH resource associated with the BFD-RS set in which the beam failure is detected.

Thereafter, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may not be included in the corresponding message.

On the other hand, it may be assumed that BF occurs in a single SCell, and the BF occurs in all TRPs within the SCell in which the BFR procedure is triggered. In this case, the UE may request BFR (i.e. transmit BFRQ) to the base station by utilizing one of the two PUCCH resources (configured in the SpCell) or by utilizing the PUCCH resource selected according to a specific rule.

As an example, the PUCCH resource selected according to the specific rule may be defined based on at least one of the following examples.

'PUCCH of lowest index'

PUCCH in which 'PUCCH-spatialRelationInfo of lowest index' is configured/activated PUCCH in which 'TCI-state of lowest index' is configured/activated/indicated After the BFRQ transmission of the UE, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may be included in the corresponding message. Or/and there may be a PUCCH resource pre-defined by the base station configuration in the message. For example, the base station may configure a primary PUCCH resource among a plurality of dedicated (SR) PUCCH resources.

Example 2) It may be assumed that BF occurs in a plurality of SCells, and the corresponding BF occurs in a specific TRP within the SCell(s) in which the BFR procedure is triggered.

The UE may transmit the BFRQ to the base station through the PUCCH resource related to the corresponding TRP (or TRP in which BF does not occur) among the two PUCCH resources (configured in the SpCell).

As an example, the UE may request BFR (i.e. transmit BFRQ) to the base station through the PUCCH resource of the SpCell related to a specific CORESETPoolIndex (and/or CORESET group index). The specific CORESETPoolIndex (and/or CORESET group index) may be related to the specific TRP.

As an example, the UE may transmit the BFRQ to the base station through the PUCCH resource associated with the BFD-RS set in which the beam failure is detected.

Thereafter, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may not be included in the corresponding message.

On the other hand, it may be assumed that BF occurs in a plurality of SCells, and the failed TRP (i.e. TRP in which BF is detected) is different for each SCell in the SCell(s) in which the BFR procedure is triggered (Example: when both-TRP (TRP 1/2) fails in SCell #1, TRP 1 fails in SCell #2, and TRP 2 fails in SCell #3).

Among the SCell (s), the UE may request BFR (i.e. transmit BFRQ) to the base station by utilizing the PUCCH resource related to the TRP determined based on the number of beam failure detections or by utilizing the PUCCH resource selected according to a specific rule.

The TRP determined based on the number of beam failure detection may mean a TRP in which a beam failure is detected a greater number of times (that is, a TRP with the highest number of beam failure detections) or a TRP in which a beam failure is detected a small number of times (that is, a TRP with the fewest number of beam failure detections).

As an example, the PUCCH resource related to the TRP determined based on the number of beam failure detection may be a PUCCH resource of SpCell associated with a specific CORESETPoolIndex (and/or CORESET group index). The specific CORESETPoolIndex (and/or CORESET group index) may be related to the determined TRP.

As an example, the PUCCH resource selected according to the specific rule may be defined based on at least one of the following examples.

'PUCCH of lowest index'

PUCCH in which 'PUCCH-spatialRelationInfo of lowest index' is configured/activated PUCCH in which 'TCI-state of lowest index' is configured/activated/indicated After the BFRQ transmission of the UE, a subsequent operation (based on the PUCCH-based BFR procedure) between the base station and UE (see 1) to 3) of i-1) b) above) may be performed. In the BFR MAC CE transmission of the UE, information on failed TRP for each cell (i.e. a TRP in which BF is detected) may be included in the corresponding message. Or/and there may be a PUCCH resource pre-defined by the base station configuration. For example, the base station may configure a primary PUCCH resource among a plurality of dedicated (SR) PUCCH resources.

The combination based on two or more of the operation a), the operation b), or the operation c) may be applied to the UE/base station operation.

In terms of implementation, operations of the base station/UE according to the above-described embodiments (e.g. operation related to beam failure recovery based on at least one of proposal 1/i-1 of embodiment i/i-2 of embodiment i/ii-1 of embodiment ii/ii-2 of embodiment ii) may be processed by the device of FIGS. 14 to 18 (e.g. processors 102 and 202 in FIG. 15), which will be described later.

In addition, the operations of the base station/UE according to the above-described embodiment (e.g. operation related to beam failure recovery based on at least one of proposal 1/i-1 of embodiment i/i-2 of embodiment i/ii-1 of embodiment ii/ii-2 of embodiment ii) may be stored in the memory (e.g. 104 and 204 in FIG. 15) in the form of instructions/programs (e.g. instruction, executable code) for driving at least one processor (e.g. 102, 202 in FIG. 15).

Hereinafter, the above-described embodiments will be described in detail with reference to FIG. 12 in terms of the operation of the UE. Methods to be described below are only divided for convenience of description, and it is needless to say that some components of one method may be substituted with some components of another method, or may be applied in combination with each other.

FIG. 12 is a flowchart for describing a method of performing, by a UE, a beam failure recovery procedure in a wireless communication system according to an embodiment of the present disclosure.

Referring to FIG. 12, a method for performing, by a user equipment (UE), a beam failure recovery (BFR) procedure in a wireless communication system according to an embodiment of the present disclosure may include receiving configuration information related to the beam failure recovery (BFR) (S1210), receiving a downlink reference signal (DL RS) (S1220), detecting a beam failure based on measurement for the DL RS (S1230), and transmitting a request message for the beam failure recovery (BFR) (S1240).

In S1210, the UE receives the configuration information related to the BFR from the base station.

According to one embodiment, the configuration information related to the BFR may include information on at least one of i) a beam failure detection RS set configured for the BFR (e.g. BFD-RS set), ii) a resource for transmission of a request message for the BFR (e.g. PRACH resource, PUCCH resource), or iii) a candidate beam RS set for candidate beam identification (e.g. candidateBeamRSList).

As an example, the configuration information related to the BFR may include information based on the proposal 1 (e.g. configuration for (SR) PUCCH resources for beam failure recovery request (Beam Failure Recovery request, BFRQ)).

As an example, the configuration information related to the BFR may include information (e.g. BFD-RS set, new beam identification RS (NBI-RS) set per TRP) related to TRP-specific beam failure recovery (TRP-specific BFR) according to Table 9.

As an example, the configuration information related to the BFR may include information based on the Proposal 1 and information related to TRP-specific beam failure recovery (TRP-specific BFR) according to Table 9.

According to the above-described S1210, an operation in which the UE (100/200 in FIGS. 14 to 18) receives the configuration information related to the BFR from the base station (100/200 in FIGS. 14 to 18) may be implemented by the devices of FIGS. 14 to 18. For example, referring to FIG. 15, one or more processors 102 may control one or more transceivers 106 and/or one or more memories 104 to receive the configuration information related to the BFR from the base station 200.

In S1220, the UE receives a downlink reference signal (DL RS) from the base station based on the configuration information.

According to an embodiment, the DL RS may be based on a plurality of DL RS sets for beam failure detection. The plurality of DL RS sets may be based on a plurality of BFD-RS sets of the Proposal 1.

According to the above-described S1220, an operation in which the UE (100/200 in FIGS. 14 to 18) receives a downlink reference signal (DL RS) from the base station (100/200 in FIGS. 14 to 18) based on the configuration information may be implemented by the devices of FIGS. 14 to 18. For example, referring to FIG. 15, one or more processors 102 may control one or more transceivers 106 and/or one or more memories 104 to receive the downlink reference signal (DL RS) from the base station 200 based on the configuration information.

In S1230, the UE detects a beam failure based on the measurement for the DL RS. The beam failure detection operation of the UE may be performed based on what has been described in the above-described beam failure detection (BFD).

According to the above-described S1230, an operation in which the UE (100/200 in FIGS. 14 to 18) detects a beam failure based on the measurement of the DL RS may be implemented by the devices of FIGS. 14 to 18. For example, referring to FIG. 15, one or more processors 102 may control one or more transceivers 106 and/or one or more memories 104 to detect a beam failure based on the measurement for the DL RS.

In S1240, the UE transmits a request message for the BFR to the base station.

According to an embodiment, the request message for the BFR may be transmitted based on a PUCCH resource related to a scheduling request (SR).

When a plurality of PUCCH resources are configured for beam failure recovery and TRP (BFD-RS set) in which beam failure is detected is different for each cell, ambiguity may occur in terms of UE operation in the PUCCH resource determination. In this regard, the following operation may be considered.

According to one embodiment, based on 1) the PUCCH resource related to the SR being one of a plurality of PUCCH resources configured for the beam failure recovery and 2) the beam failure being related to one or more cells, the PUCCH resource related to the SR may be a specific PUCCH resource determined based on a preconfigured criterion among the plurality of PUCCH resources. For example, the one or more cells may be cells within the same cell group (i.e. one cell group). The one or more cells may include a primary cell (PCell) or a primary secondary cell (PSCell).

Each of the plurality of PUCCH resources may be associated with at least one of i) one DL RS set among the plurality of DL RS sets, ii) a control resource set pool index (CORESET pool index) or iii) a subset of all CORESETs in a bandwidth part (BWP). The plurality of PUCCH resources may be PUCCH resources based on the Proposal 1. As an example, the plurality of PUCCH resources may be based on (SR) PUCCH resources for BFRQ configured for each cell group.

As an example, the specific PUCCH resource may be associated with at least one of i) a primary cell (PCell) or ii) a primary secondary cell (PSCell). That is, when beam failure is detected in the one or more cells, the PUCCH resource for transmission of the request message for BFR (i.e. BFRQ) may be determined based on SpCell (PCell and/or PSCell). Hereinafter, it will be described in detail. This embodiment may be based on ii-2) of embodiment ii) of the Proposal 1.

The one or more cells may include the SpCell. That is, the one or more cells may include the PCell or the PSCell. When beam failure is detected in the one or more cells (e.g. SpCell+SCell(s)), a PUCCH resource for BFRQ transmission may be determined based on the SpCell (PCell/PSCell).

Specifically, the PUCCH resource for transmission of the request message for the BFR may be determined based on the beam failure (and associated TRP) detected in the SpCell. The PUCCH resource for transmission of the request message for the BFR may be determined based on a BFD-RS set (e.g. one of the plurality of DL RS sets) associated with the SpCell (i.e. PUCCH resource associated with the BFD-RS set in which the beam failure of the SpCell is detected).

As the PUCCH resource for transmission of the request message for the BFR is determined based on the BFD-RS set associated with the SpCell, the following effects are derived. Since the cell to which the corresponding PUCCH is transmitted is an SpCell, not an SCell, the UE may transmit a request message for the BFR by utilizing a PUCCH resource towards a more robust TRP in the SpCell.

As an example, the specific PUCCH resource may be related to a specific DL RS set. The specific DL RS set may be a DL RS set determined based on the number of beam failure detections among DL RS sets related to the one or more cells. The specific DL RS set may be a DL RS set having the largest number of beam failure detections.

As an example, the specific PUCCH resource may be a PUCCH resource having the lowest index among the plurality of PUCCH resources.

As an example, the specific PUCCH resource may be a PUCCH resource related to specific spatial related information among the plurality of PUCCH resources. The specific spatial related information may be based on PUCCH-spatialRelationInfo having the lowest index.

As an example, the specific PUCCH resource may be a PUCCH resource related to a specific transmission configuration indication state (specific TCI state) among the plurality of PUCCH resources. The specific TCI state may be a TCI state having the lowest index.

According to S1240 described above, an operation in which the UE (100/200 in FIGS. 14 to 18) transmits a request message for the BFR to the base station (100/200 in FIGS. 14 to 18) may be implemented by the devices of FIGS. 14 to 18. For example, referring to FIG. 15, the one or more processors 102 may control the one or more transceivers 106 and/or one or more memories 104 to transmit the request message for the BFR to the base station 200.

According to an embodiment, the method may further include the step of transmitting the PUSCH.

In the PUSCH transmission step, the UE may transmit a Physical Uplink Shared Channel (PUSCH) related to the BFR to the base station. The PUSCH related to the BFR may be related to a BFR MAC-CE (Medium Access Control-Control Element). The BFR MAC-CE may include information on the TRP in which the beam failure is detected. That is, the BFR MAC-CE may include information on a DL RS set related to a beam failure detected in each cell among the one or more cells.

According to the above-described PUSCH transmission step, an operation in which the UE (100/200 in FIGS. 14 to 18) transmits the physical uplink shared channel (PUSCH) related to the BFR to the base station (100/200 in FIGS. 14 to 18) may be implemented by the devices of FIGS. 14 to 18. For example, referring to FIG. 15, the one or more processors 102 may control the one or more transceivers 106 and/or the one or more memories 104 to transmit the Physical Uplink Shared Channel (PUSCH) related to the BFR to the base station 200.

Hereinafter, the above-described embodiments will be described in detail with reference to FIG. 13 in terms of the operation of the base station. Methods to be described below are only divided for convenience of description, and it is needless to say that some components of one method may be substituted with some components of another method, or may be applied in combination with each other.

FIG. 13 is a flowchart for describing a method of performing, by a BS, a beam failure recovery procedure in a wireless communication system according to another embodiment of the present disclosure.

Referring to FIG. 13, a method for performing, by a base station, a beam failure recovery (BFR) procedure in a wireless communication system according to another embodiment of the present disclosure may include transmitting configuration information related to the beam failure recovery (S1310), transmitting a DL RS (S1320), and receiving a request message for the beam failure recovery (S1330).

In S1310, the base station transmits the configuration information related to the BFR to the UE.

According to one embodiment, the configuration information related to the BFR may include information on at least one of i) a beam failure detection RS set configured for the BFR (e.g. BFD-RS set), ii) a resource for transmission of a request message for the BFR (e.g. PRACH resource, PUCCH resource), or iii) a candidate beam RS set for candidate beam identification (e.g. candidateBeamRSList).

As an example, the configuration information related to the BFR may include information based on the proposal 1 (e.g. configuration for (SR) PUCCH resources for beam failure recovery request (Beam Failure Recovery request, BFRQ)).

As an example, the configuration information related to the BFR may include information (e.g. BFD-RS set, new beam identification RS (NBI-RS) set per TRP) related to TRP-specific beam failure recovery (TRP-specific BFR) according to Table 9.

As an example, the configuration information related to the BFR may include information based on the Proposal 1 and information related to TRP-specific beam failure recovery (TRP-specific BFR) according to Table 9.

According to the above-described S1310, an operation in which the base station (100/200 in FIGS. 14 to 18) transmits the configuration information related to the BFR to the UE (100/200 in FIGS. 14 to 18) may be implemented by the devices of FIGS. 14 to 18. For example, referring to FIG. 15, one or more processors 202 may control one or more transceivers 206 and/or one or more memories 204 to transmit the configuration information related to the BFR to the UE 100.

In S1320, the base station transmits a downlink reference signal (DL RS) based on the configuration information to the UE.

According to an embodiment, the DL RS may be based on a plurality of DL RS sets for beam failure detection. The plurality of DL RS sets may be based on a plurality of BFD-RS sets of the Proposal 1.

According to the above-described S1320, an operation in which the base station (100/200 in FIGS. 14 to 18) transmits a downlink reference signal (DL RS) based on the configuration information to the UE (100/200 in FIGS. 14 to 18) may be implemented by the devices of FIGS. 14 to 18. For example, referring to FIG. 15, one or more processors 202 may control one or more transceivers 206 and/or one or more memories 204 to transmit the downlink reference signal (DL RS) based on the configuration information to the UE 100.

In S1330, the base station receives a request message for the BFR from the UE. Specifically, the UE detects beam failure based on the measurement for the DL RS. Based on the detection of the beam failure, the UE transmits a request message for the BFR to the base station. The request message for the BFR may be related to a beam failure detected based on the measurement for the DL RS.

According to an embodiment, the request message for the BFR may be received based on a PUCCH resource related to a scheduling request (SR).

When a plurality of PUCCH resources are configured for beam failure recovery, and TRP (BFD-RS set) in which beam failure is detected is different for each cell, ambiguity may occur in terms of UE operation in the PUCCH resource determination. In this regard, the base station may operate under the assumption that the request message for the BFR is transmitted by the UE through the PUCCH resource determined according to the following operations.

According to one embodiment, based on 1) the PUCCH resource related to the SR being one of a plurality of PUCCH resources configured for the beam failure recovery and 2) the beam failure being related to one or more cells, the PUCCH resource related to the SR may be a specific PUCCH resource determined based on a preconfigured criterion among the plurality of PUCCH resources. For example, the one or more cells may be cells within the same cell group (i.e. one cell group). The one or more cells may include a primary cell (PCell) or a primary secondary cell (PSCell).

Each of the plurality of PUCCH resources may be associated with at least one of i) one DL RS set among the plurality of DL RS sets, ii) a control resource set pool index (CORESET pool index) or iii) a subset of all CORESETs in a bandwidth part (BWP). The plurality of PUCCH resources may be PUCCH resources based on the Proposal 1. As an example, the plurality of PUCCH resources may be based on (SR) PUCCH resources for BFRQ configured for each cell group.

As an example, the specific PUCCH resource may be associated with at least one of i) a primary cell (PCell) or ii) a primary secondary cell (PSCell). That is, when beam failure is detected in the one or more cells, the PUCCH resource for transmission of the request message for BFR (i.e. BFRQ) may be determined based on SpCell (PCell and/or PSCell). Hereinafter, it will be described in detail. This embodiment may be based on ii-2) of embodiment ii) of the Proposal 1.

The one or more cells may include the SpCell. That is, the one or more cells may include the PCell or the PSCell. When beam failure is detected in the one or more cells (e.g. SpCell+SCell(s)), a PUCCH resource for BFRQ transmission may be determined based on the SpCell (PCell/PSCell).

Specifically, the PUCCH resource for transmission of the request message for the BFR may be determined based on the beam failure (and associated TRP) detected in the SpCell. The PUCCH resource for transmission of the request message for the BFR may be determined based on a BFD-RS set (e.g. one of the plurality of DL RS sets) associated with the SpCell (i.e. PUCCH resource associated with the BFD-RS set in which the beam failure of the SpCell is detected).

As the PUCCH resource for transmission of the request message for the BFR is determined based on the BFD-RS set associated with the SpCell, the following effects are derived. Since the cell to which the corresponding PUCCH is transmitted is an SpCell, not an SCell, the UE may transmit a request message for the BFR by utilizing a PUCCH resource towards a more robust TRP in the SpCell.

As an example, the specific PUCCH resource may be related to a specific DL RS set. The specific DL RS set may be a DL RS set determined based on the number of beam failure detections among DL RS sets related to the one or more cells. The specific DL RS set may be a DL RS set having the largest number of beam failure detections.

As an example, the specific PUCCH resource may be a PUCCH resource having the lowest index among the plurality of PUCCH resources.

As an example, the specific PUCCH resource may be a PUCCH resource related to specific spatial related information among the plurality of PUCCH resources. The specific spatial related information may be based on PUCCH-spatialRelationInfo having the lowest index.

As an example, the specific PUCCH resource may be a PUCCH resource related to a specific transmission configuration indication state (specific TCI state) among the plurality of PUCCH resources. The specific TCI state may be a TCI state having the lowest index.

According to the above-described S1330, an operation in which the base station (100/200 in FIGS. 14 to 18) receives the request message for the BFR from the UE (100/200 in FIGS. 14 to 18) may be implemented by the devices of FIGS. 14 to 18. For example, referring to FIG. 15, one or more processors 202 may control one or more transceivers 206 and/or one or more memories 204 to receive the request message for the BFR from the UE 100.

According to an embodiment, the method may further include the step of receiving the PUSCH.

In the step of receiving the PUSCH, the base station may receive a Physical Uplink Shared Channel (PUSCH) related to the BFR from the UE. The PUSCH related to the BFR may be related to a BFR MAC-CE (Medium Access Control-Control Element). The BFR MAC-CE may include information on the TRP in which the beam failure is detected. That is, the BFR MAC-CE may include information on a DL RS set related to a beam failure detected in each cell among the one or more cells.

According to the above-described PUSCH reception step, an operation in which the base station (100/200 in FIGS. 14 to 18) receives the physical uplink shared channel (PUSCH) related to the BFR from the UE (100/200 in FIGS. 14 to 18) may be implemented by the devices of FIGS. 14 to 18. For example, referring to FIG. 15, the one or more processors 102 may control the one or more transceivers 106 and/or the one or more memories 104 to receive the Physical Uplink Shared Channel (PUSCH) related to the BFR from the UE 100.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 14 illustrates a communication system 1 applied to the present disclosure.

Referring to FIG. 14, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s)

104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Signal Processing Circuit Applied to the Present Disclosure

FIG. 16 illustrates a signal process circuit for a transmission signal.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Present Disclosure

FIG. 17 illustrates another example of a wireless device applied to the present disclosure.

The wireless device may be implemented in various forms according to a use-case/service (refer to FIG. 14). Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a fintech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

FIG. 18 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Here, the wireless communication technology implemented in the device (FIGS. 14 to 18) of the present disclosure may include LTE, NR, and 6G as well as Narrowband Internet of Things (NB-IoT) for low-power communication. For example, the NB-IoT technology may be an example of a LPWAN (Low Power Wide Area Network) technology, and may be implemented in standards such as LTE Cat NB1 and/or LTE Cat NB2, and is not limited to the above-described name.

Additionally or alternatively, the wireless communication technology implemented in the device (FIGS. 14 to 18) of the present disclosure may perform communication based on the LTE-M technology. For example, the LTE-M technology may be an example of LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M, and is not limited to the above-described name.

Additionally or alternatively, the wireless communication technology implemented in the device (FIGS. 14 to 18) of the present disclosure may include at least one of ZigBee, Bluetooth, and Low Power Wide Area Network (LPWAN) in consideration of low power communication, and is not limited to the above-described name. For example, the ZigBee technology may generate PAN (personal area networks) related to small/low-power digital communication based on various standards such as IEEE 802.15.4, and may be called by various names.

In the embodiments described above, the components and the features of the present disclosure are combined in a predetermined form. Each component or feature should be considered as an option unless otherwise expressly stated. Each component or feature may be implemented not to be associated with other components or features. Furthermore, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

What is claimed is:

1. A method performed by a user equipment (UE) in a wireless communication system, the method comprising:
    receiving information related to a cell group that includes two configurations for PUCCH transmission;
    receiving information including two Beam Failure Detection-Reference Signal sets (BFD-RS sets);
    detecting a beam failure based on a beam failure instance (BFI) counter being equal to or greater than a beam failure instance max count,
    wherein the BFI counter is set for each of the two BFD-RS sets; and
    transmitting a Physical Uplink Control Channel (PUCCH) related to the beam failure, based on one of the two configurations,
    wherein the two BFD-RS sets are related to a serving cell which is a Primary Cell (PCell), a Primary Secondary Cell (PSCell) or a Secondary Cell (SCell),
    wherein, based on 1) the two BFD-RS sets being related to the PCell or the PSCell and 2) the two configurations including a first configuration associated with a first BFD-RS set of the two BFD-RS sets and a second configuration associated with a second BFD-RS set of the two BFD-RS sets:
        based on the BFI counter of the first BFD-RS set being equal to or greater than the beam failure instance max count, the first configuration is used for the transmission of the PUCCH related to the beam failure,
        based on the BFI counter of the second BFD-RS set being equal to or greater than the beam failure instance max count, the second configuration is used for the transmission of the PUCCH related to the beam failure.

2. The method of claim 1, wherein each of the first configuration and the second configuration is related to a PUCCH resource.

3. The method of claim 1, wherein, based on the beam failure being detected in one of the two BFD-RS sets related to the PCell or the PSCell, the PUCCH related to the beam failure is transmitted, and
    wherein, based on the beam failure being detected in the two BFD-RS sets related to the PCell or the PSCell, a Random Access procedure on the PCell or the PSCell is initiated.

4. The method of claim 1, wherein each of the two BFD-RS sets is associated with one of multiple Transmission and Reception Points (TRPs).

5. The method of claim 1, further comprising: transmitting a Beam Failure Recovery Medium Access Control Control Element (BFR MAC CE).

6. The method of claim 5, wherein the BFR MAC CE includes i) information related to one or more serving cells for which the beam failure is detected and ii) information related to a BFD-RS set in which the beam failure is detected among the two BFD-RS sets configured in each of the one or more serving cells.

7. The method of claim 6, wherein, for the BFD-RS set in which the beam failure is detected among two BFD-RS sets configured in each of the one or more serving cells, the BFR MAC CE further includes information related to a candidate Reference Signal (RS) which is based on one of two candidate beam RS lists,
    wherein each of the two candidate beam RS lists is associated with each of the two BFD-RS sets.

8. A user equipment (UE) operating in a wireless communication system, the UE comprising:
    one or more transceivers;
    one or more processors controlling the one or more transceivers; and
    one or more memories operably connected to the one or more processors,
    wherein the one or more memories store instructions for performing operations based on being executed by the one or more processors,
    wherein the operations include:
    receiving information related to a cell group that includes two configurations for PUCCH transmission;
    receiving information including two Beam Failure Detection-Reference Signal sets (BFD-RS sets);
    detecting a beam failure based on a beam failure instance (BFI) counter being equal to or greater than a beam failure instance max count, wherein the BFI counter is set for each of the two BFD-RS sets; and
    transmitting a Physical Uplink Control Channel (PUCCH) related to the beam failure, based on one of the two configurations,
    wherein the two BFD-RS sets are related to a serving cell which is a Primary Cell (PCell), a Primary Secondary Cell (PSCell) or a Secondary Cell (SCell),
    wherein, based on 1) the two BFD-RS sets being related to the PCell or the PSCell and 2) the two configurations including a first configuration associated with a first BFD-RS set of the two BFD-RS sets and a second configuration associated with a second BFD-RS set of the two BFD-RS sets:
        based on the BFI counter of the first BFD-RS set being equal to or greater than the beam failure instance max count, the first configuration is used for the transmission of the PUCCH related to the beam failure,
        based on the BFI counter of the second BFD-RS set being equal to or greater than the beam failure instance max count, the second configuration is used for the transmission of the PUCCH related to the beam failure.

9. A base station operating in a wireless communication system, the base station comprising:
one or more transceivers;
one or more processors controlling the one or more transceivers; and
one or more memories operably connected to the one or more processors,
wherein the one or more memories store instructions for performing operations based on being executed by the one or more processors,
wherein the operations include:
transmitting information related to a cell group that includes two configurations for PUCCH transmission;
transmitting information including two Beam Failure Detection-Reference Signal sets (BFD-RS sets);
receiving a Physical Uplink Control Channel (PUCCH) related to a beam failure, based on one of the two configurations,
wherein the beam failure is detected based on a beam failure instance (BFI) counter being equal to or greater than a beam failure instance max count, and the BFI counter is set for each of the two BFD-RS sets,
wherein the two BFD-RS sets are related to a serving cell which is a Primary Cell (PCell), a Primary Secondary Cell (PSCell) or a Secondary Cell (SCell),
wherein, based on 1) the two BFD-RS sets being related to the PCell or the PSCell and 2) the two configurations including a first configuration associated with a first BFD-RS set of the two BFD-RS sets and a second configuration associated with a second BFD-RS set of the two BFD-RS sets:
based on the BFI counter of the first BFD-RS set being equal to or greater than the beam failure instance max count, the PUCCH related to the beam failure is received based on the first configuration,
based on the BFI counter of the second BFD-RS set being equal to or greater than the beam failure instance max count, the PUCCH related to the beam failure is received based on the second configuration.

* * * * *